(12) United States Patent
Foulk et al.

(10) Patent No.: US 10,618,193 B2
(45) Date of Patent: Apr. 14, 2020

(54) DISMANTLING SYSTEM

(71) Applicant: Alliance Automation LLC, Van Wert, OH (US)

(72) Inventors: Boyd S. Foulk, Fort Wayne, IN (US); Justin Haverstock, Auburn, IN (US)

(73) Assignee: ALLIANCE AUTOMATION, LLC, Van Wert, OH (US)

( * ) Notice: Subject to any disclaimer, the term of this patent is extended or adjusted under 35 U.S.C. 154(b) by 285 days.

(21) Appl. No.: 15/599,414

(22) Filed: May 18, 2017

(65) Prior Publication Data

US 2017/0336194 A1    Nov. 23, 2017

Related U.S. Application Data

(60) Provisional application No. 62/338,038, filed on May 18, 2016.

(51) Int. Cl.

| | |
|---|---|
| *G01B 11/02* | (2006.01) |
| *G05B 19/40* | (2006.01) |
| *G05B 19/41* | (2006.01) |
| *B27B 13/02* | (2006.01) |
| *B25J 15/00* | (2006.01) |
| *B25J 9/00* | (2006.01) |
| *B25J 9/16* | (2006.01) |
| *B65G 47/91* | (2006.01) |
| *B65G 47/248* | (2006.01) |
| *B65G 47/252* | (2006.01) |
| *G05B 19/401* | (2006.01) |
| *G05B 19/418* | (2006.01) |

(52) U.S. Cl.
CPC ............ *B27B 13/02* (2013.01); *B25J 9/0093* (2013.01); *B25J 9/1679* (2013.01); *B25J 15/0052* (2013.01); *B65G 47/248* (2013.01); *B65G 47/252* (2013.01); *B65G 47/91* (2013.01); *G01B 11/02* (2013.01); *G05B 19/401* (2013.01); *G05B 19/41815* (2013.01); *Y10S 901/40* (2013.01); *Y10T 29/49782* (2015.01)

(58) Field of Classification Search
CPC .... B25J 9/1679; B25J 9/0093; B25J 15/0052; G05B 19/41815; G05B 19/401; G01B 11/02; B65G 47/248; B65G 47/91; B65G 47/252; Y10S 901/40; Y10T 29/49782; B27B 13/02

See application file for complete search history.

(56) References Cited

U.S. PATENT DOCUMENTS

| | | | | |
|---|---|---|---|---|
| 2,625,329 | A  *  | 1/1953 | Roger Wells | .......... B65G 57/03 235/98 R |
| 4,750,255 | A  *  | 6/1988 | Hufnagel | .............. B23P 19/041 29/426.4 |
| 5,279,094 | A  *  | 1/1994 | Odom | ................... B65B 51/065 53/139.1 |

(Continued)

*Primary Examiner* — Bayan Salone
(74) *Attorney, Agent, or Firm* — Shumaker, Loop & Kendrick, LLP; James D. Miller

(57) ABSTRACT

A system for dismantling a pallet includes a feed system configured to convey the pallet along a direction of travel. The feed system has a measuring station and a staging area. The measuring station is configured to obtain dimensions of the pallet. A saw is configured to dismantle the pallet. A manipulator includes a robotic arm. The manipulator is configured to move the pallet from the staging area to the saw for dismantling.

6 Claims, 20 Drawing Sheets

(56) References Cited

U.S. PATENT DOCUMENTS

| | | | | |
|---|---|---|---|---|
| 5,379,513 | A * | 1/1995 | Thompson | B27F 7/006 227/45 |
| 5,600,882 | A * | 2/1997 | Beane | B23P 19/041 29/239 |
| 7,117,586 | B2 * | 10/2006 | Dykstra | B23P 19/041 29/772 |
| 8,752,457 | B1 * | 6/2014 | Cosgrove | B23D 53/026 29/426.5 |
| 9,321,138 | B2 * | 4/2016 | Gilbert | B23P 19/048 |
| 9,339,902 | B2 * | 5/2016 | Berg | B23P 19/041 |
| 2002/0082802 | A1 * | 6/2002 | Stringer | G01B 11/00 702/159 |
| 2002/0129583 | A1 * | 9/2002 | Simmons, Jr. | B31D 5/0047 53/472 |
| 2002/0134643 | A1 * | 9/2002 | Schmale | B65G 13/075 193/37 |
| 2004/0129865 | A1 * | 7/2004 | Doane | G02B 5/124 250/216 |
| 2005/0155419 | A1 * | 7/2005 | Naruoka | G01B 11/028 73/159 |
| 2010/0200365 | A1 * | 8/2010 | Pressler | B65G 17/24 198/460.1 |
| 2012/0284987 | A1 * | 11/2012 | Townsend | B23P 19/041 29/426.3 |
| 2013/0255077 | A1 * | 10/2013 | Berg | B23P 19/041 29/791 |
| 2017/0223947 | A1 * | 8/2017 | Gall | G01N 21/4738 |

\* cited by examiner

DISMANTLING SYSTEM

CROSS-REFERENCE TO RELATED APPLICATIONS

This patent application claims the benefit of U.S. Provisional Patent Application Ser. No. 62/338,038, filed on May 18, 2017. The entire disclosure of the above patent application is hereby incorporated herein by reference.

FIELD OF THE INVENTION

The invention relates generally to a system and method for dismantling wooden pallets, and particularly to a method and apparatus for robotically dismantling wooden pallets.

BACKGROUND

Since the development of the modern forklift in the early part of the twentieth century, the wooden pallet has been relied upon as an efficient means of handling and transporting bulk goods and freight. The wooden pallet is particularly desirable due to its relatively low cost to manufacture as well as the abundance and renewability of wood. According to the U.S. Forest Service, there are approximately two billion wooden pallets currently in circulation throughout the United States.

While the relative durability of wood makes it a desirable material for pallets, it is subject to deterioration and destruction over a period of time. For example, individual boards forming the pallet may rot if continuously exposed to moisture or may be broken during handling. Accordingly, there is a continuous need for new pallets to replace destroyed or expended pallets and fill a growing market demand.

Although wood is a readily available resource, there are a number of factors driving a desire to maximize recovery of pallets, as opposed to continuously manufacturing new pallets. For example, wood used in pallets is typically treated with a preservative chemical in order to minimize decomposition. While effective in extending the life of the pallet, the preservative chemical is toxic, making disposal of pallets harmful to the environment. In addition, despite the renewable nature of wood, the sheer volume of pallets used in the United States has further driven the desire to recover as many pallets as possible in order to minimize cost and consumption.

Pallets vary in make, size, and construction. Because of the inconsistency in size and construction of pallets, pallet recovery has historically been a substantially manual process, requiring individuals to dismantle expended pallets using various hand tools in order to salvage useable components. This is generally an inefficient and physically demanding process requiring each board of a pallet to be removed individually. Attempts to automate pallet disassembly have been minimally successful. Many systems lack an ability to accommodate manufacturing inconsistencies among pallets.

Accordingly, there exists a need in the art for an automated system and method for dismantling pallets, wherein the system is capable of detecting and accommodating manufacturing inconsistencies among pallets.

SUMMARY

In concordance with the instant disclosure, an automated system and method for dismantling pallets, wherein the system is capable of detecting and accommodating manufacturing inconsistencies of among pallets.

According to an embodiment of the instant disclosure, A system for dismantling a pallet includes a feed system configured to convey the pallet along a direction of travel. The feed system has a measuring station and a staging area. The measuring station is configured to obtain dimensions of the pallet. A saw is configured to dismantle the pallet. A manipulator includes a robotic arm. The manipulator is configured to move the pallet from the staging area to the saw for dismantling.

According another embodiment of the instant disclosure, a system for dismantling a pallet is disclosed. The system includes a feed system configured to convey the pallets along a direction of travel. The feed system has a measuring station and a staging area. The measuring station is configured to obtain dimensions of the pallet. The measuring station includes a first sensor unit extending in a direction substantially perpendicular to the direction of travel and a second sensor unit extending in a direction substantially parallel with respect to the direction of travel. The system additionally includes a saw configured to dismantle the pallet and a manipulator comprising a robotic arm. The manipulator configured to move the pallets from the staging area to the saw for dismantling.

In a further embodiment of the instant disclosure, a system for dismantling pallets is disclosed. The system includes a pallet and a feed system configured to convey the pallet along a direction of travel. The feed station has a measuring station and a staging area. The measuring station obtains dimensions of the pallet. The system includes a saw receiving the pallet and dismantling the pallet. The system further includes a manipulator comprising a robotic arm and an end of arm tool configured to support the pallet. The manipulator moves the pallet from the staging area to the saw for dismantling. The manipulator receiving values of the dimension of the pallet from the measuring station via a controller.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. As used herein, the term "substantially" means approximate to or almost.

Figure 1:
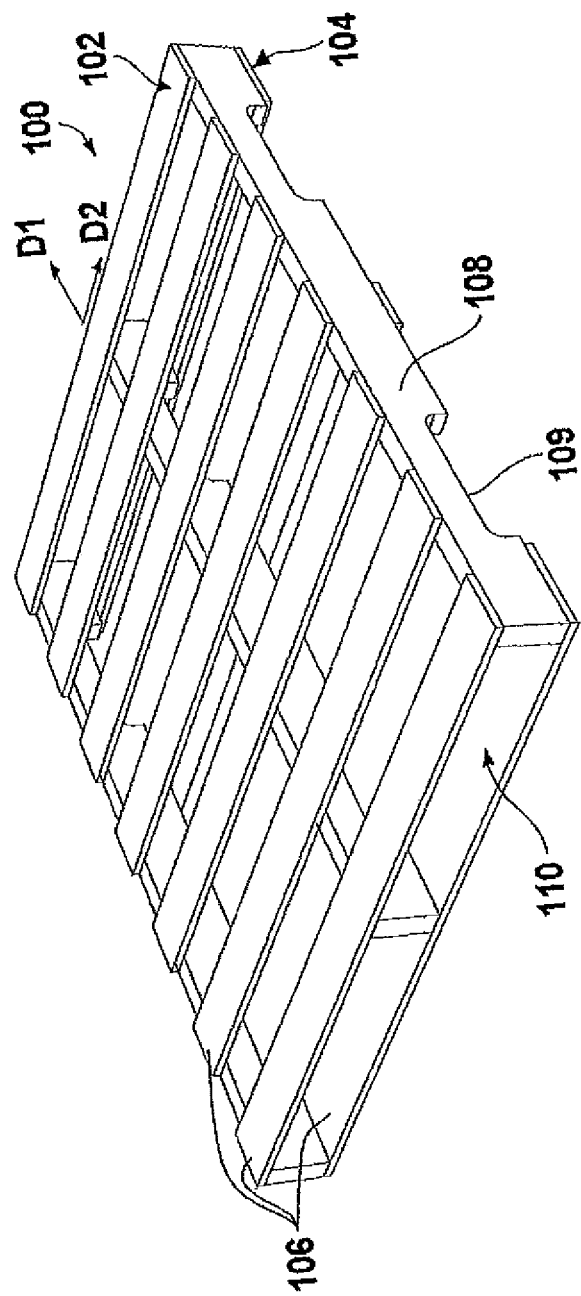
FIG. 1 is a top perspective view of a pallet according to according to prior art.
Figure 2:
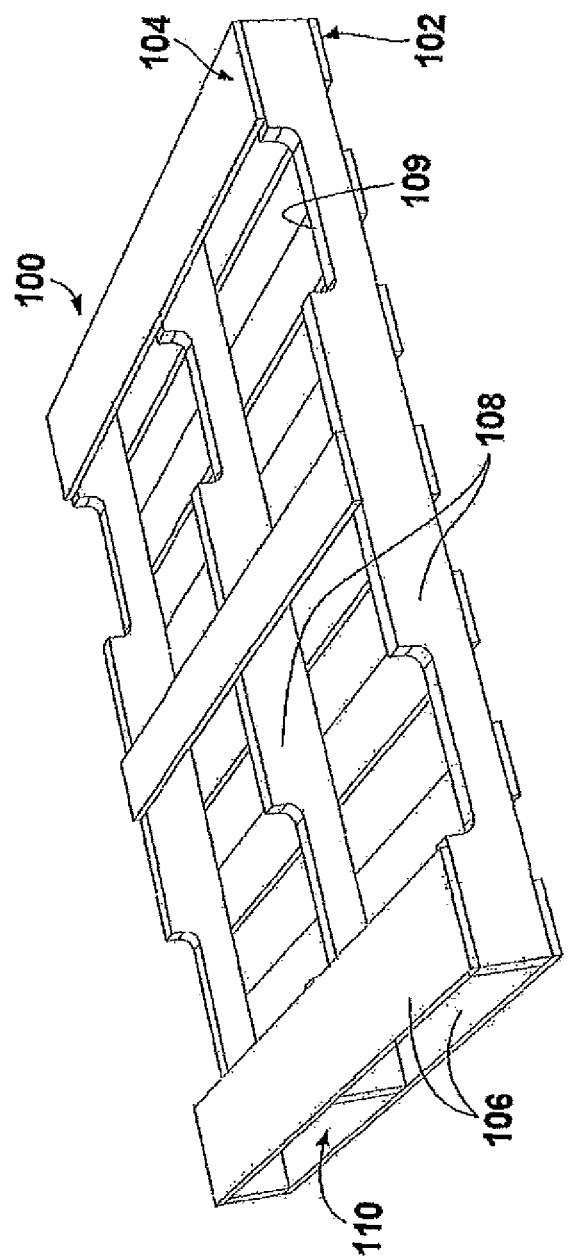
FIG. 2 is a bottom perspective view of the pallet of FIG. 1.

As shown in FIGS. 1-2, a pallet 100 as discussed herein includes a top deck 102 and a bottom deck 104, each comprising a plurality of deck boards 106. The deck boards 106 of each of the top deck 102 and the bottom deck 104 are aligned substantially parallel to each other in a first direction D1. The pallet 100 further includes a plurality of stringers 108 disposed intermediate the top deck 102 and the bottom deck 104. The stringers 108 are oriented transverse to the deck boards 106 of the top deck 102 and the bottom deck 104 in a second direction D2. The stringers 108 include notches 109 formed thereon. A plurality of fork pockets 110 is formed intermediate adjacent ones of the stringers 108 and the opposing top deck 102 and bottom deck 104. The pallets 100 constructed in this manner may be provided in any size and overall shape by changing a length and quantity of the deck boards 106 and/or stringers 108, as shown.

Figure 3:
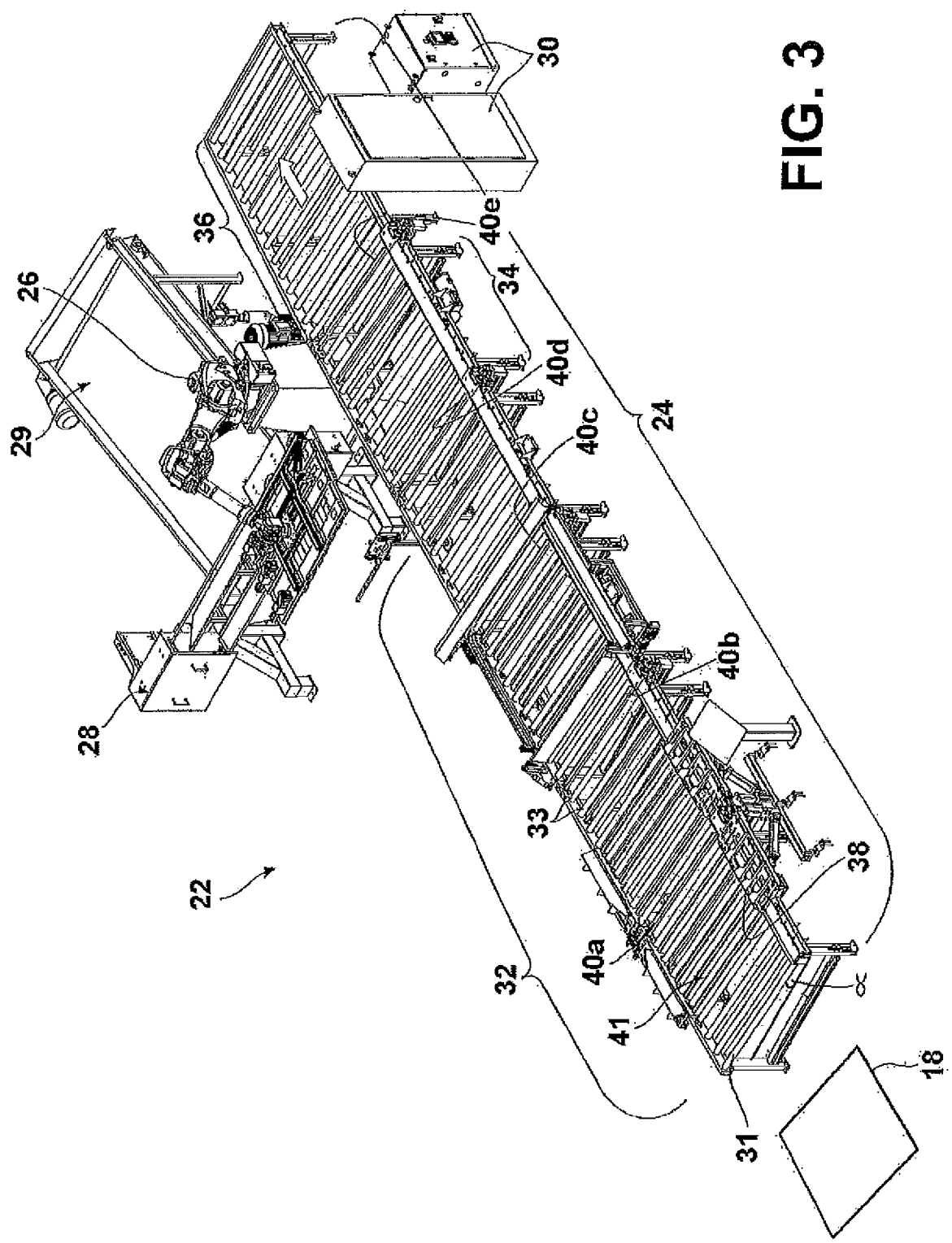
FIG. 3 is a top perspective view of a system according to an embodiment of the instant disclosure.
Figure 4:
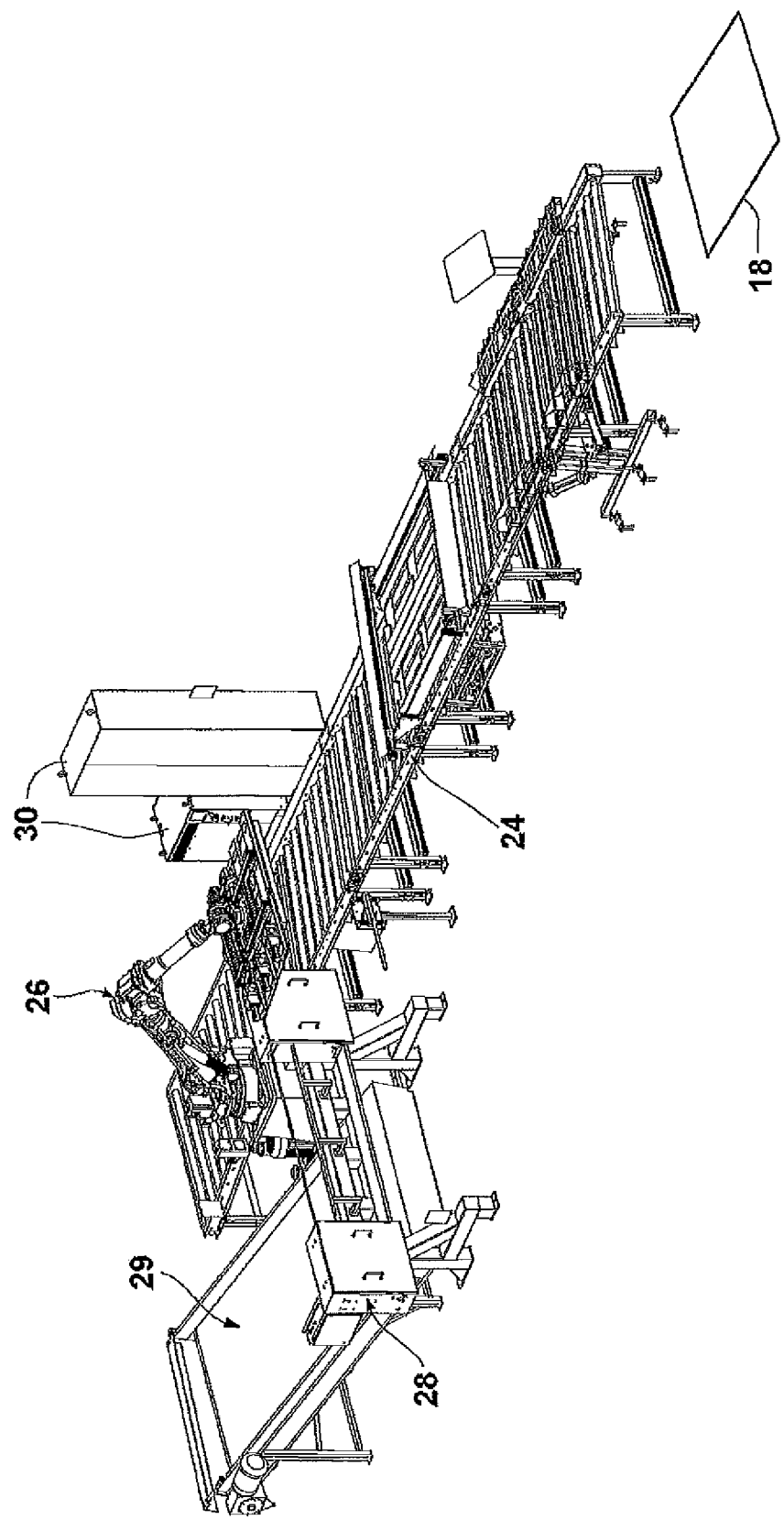
FIG. 4 is a top perspective view of the system of FIG. 3.
Figure 5:
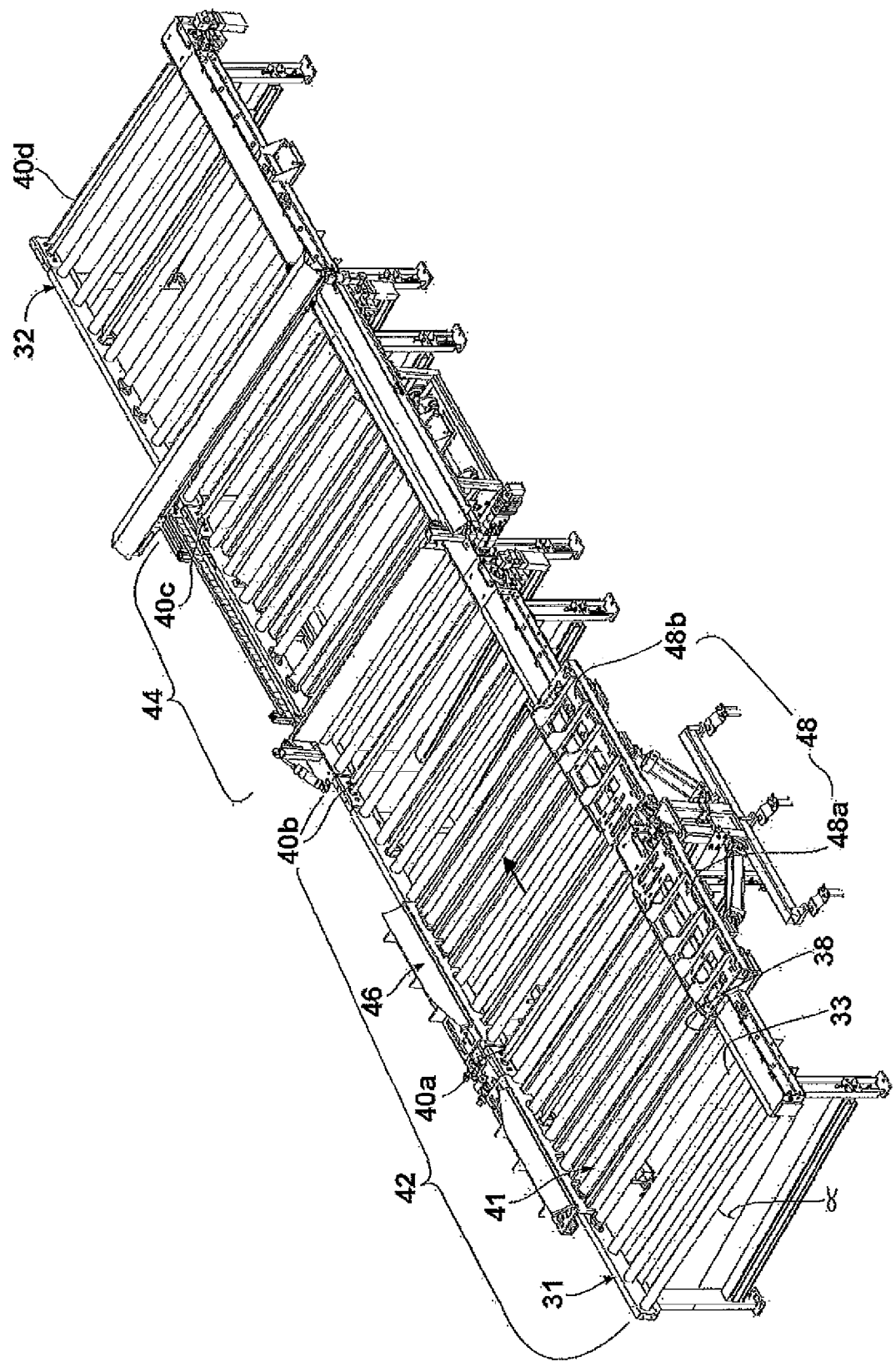
FIG. 5 is a top perspective view of a gage station of the system of FIGS. 3-4.
Figure 6:
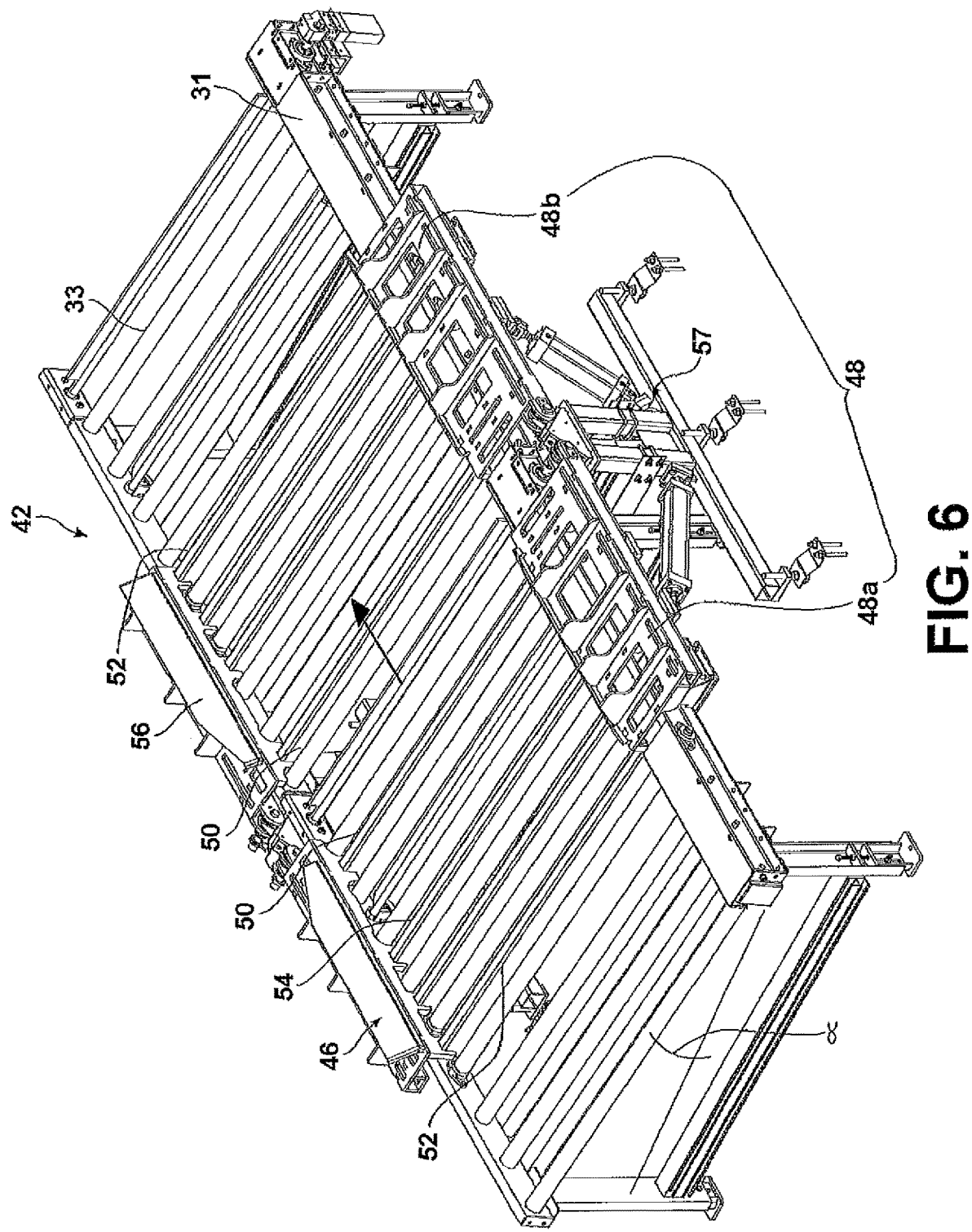
FIG. 6 is a top perspective view of a flipping station of the gage station of FIG. 5.
Figure 7:
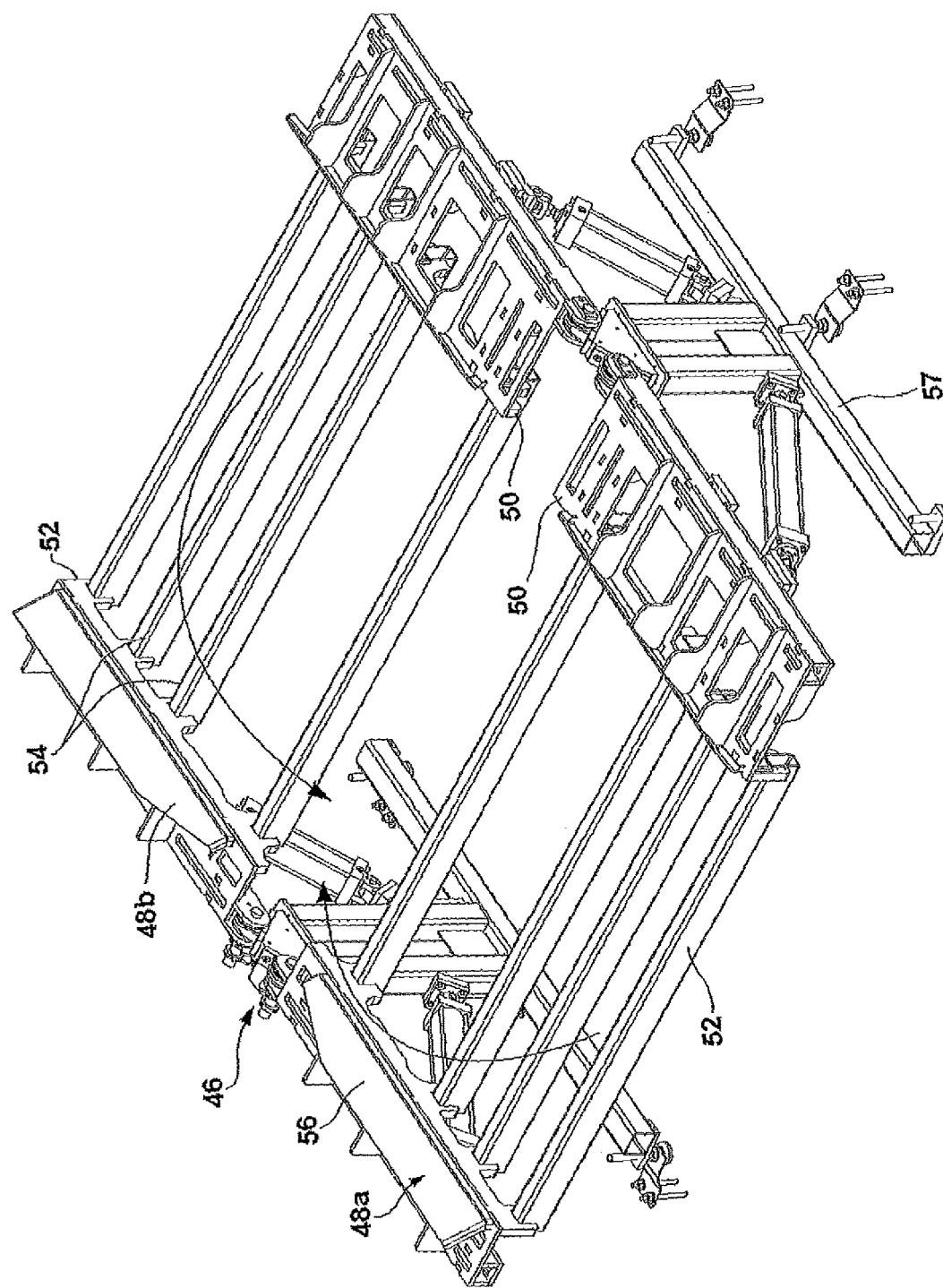
FIG. 7 is a top perspective view of an inverter of the flipping station of FIG. 6.
Figure 8:
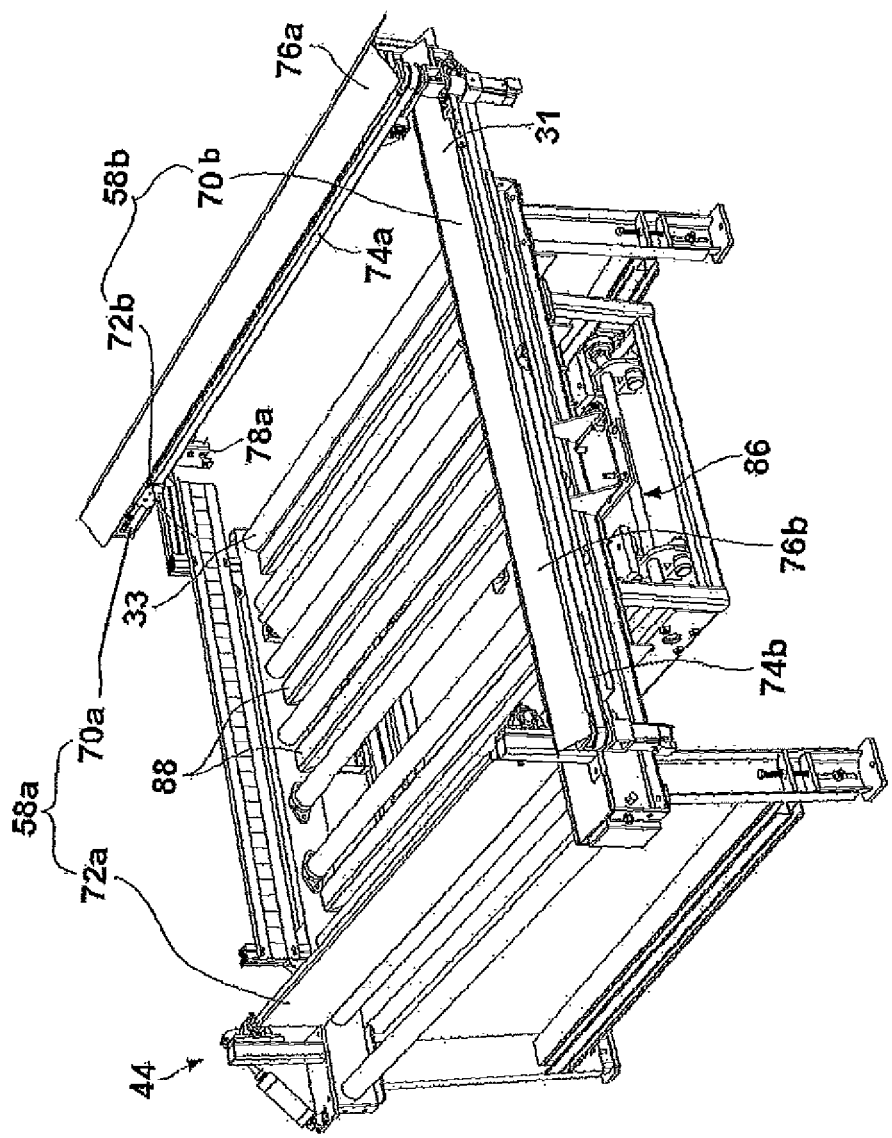
FIG. 8 is a top perspective view of a measuring station of the gage station of FIG. 5.
Figure 9:
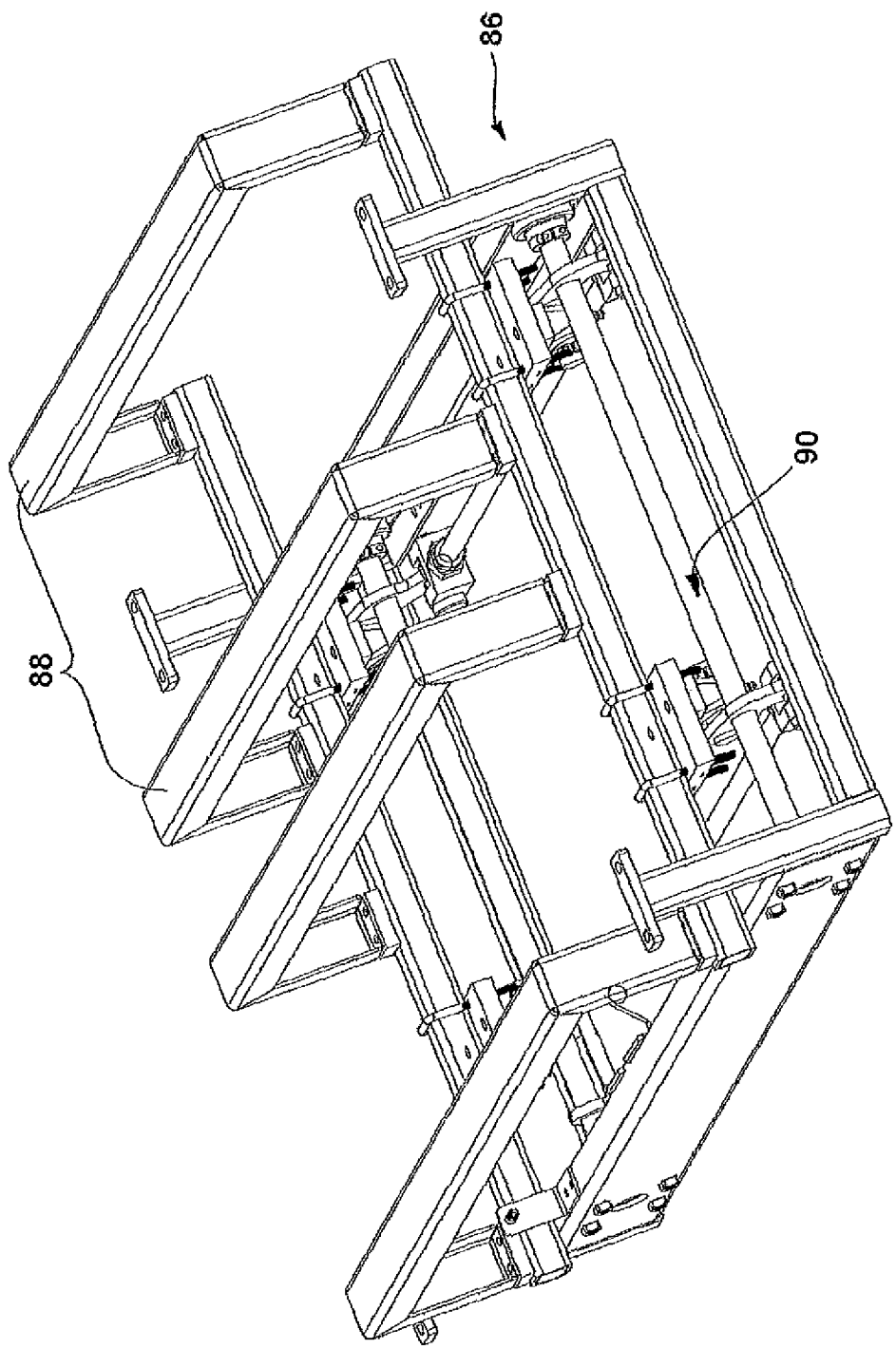
FIG. 9 is a top perspective view of a lift riser of the measuring station of FIG. 8.
Figure 10:
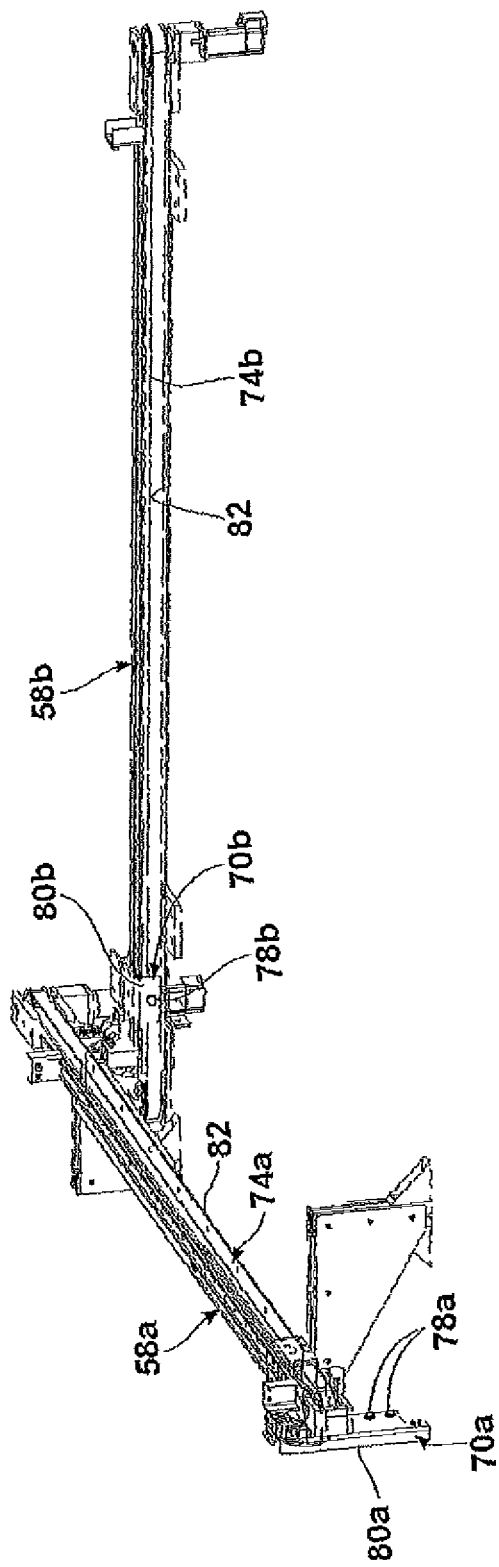
FIG. 10 is a fragmentary right perspective view of portions of sensing units of the measuring station of FIG. 8.
Figure 11:
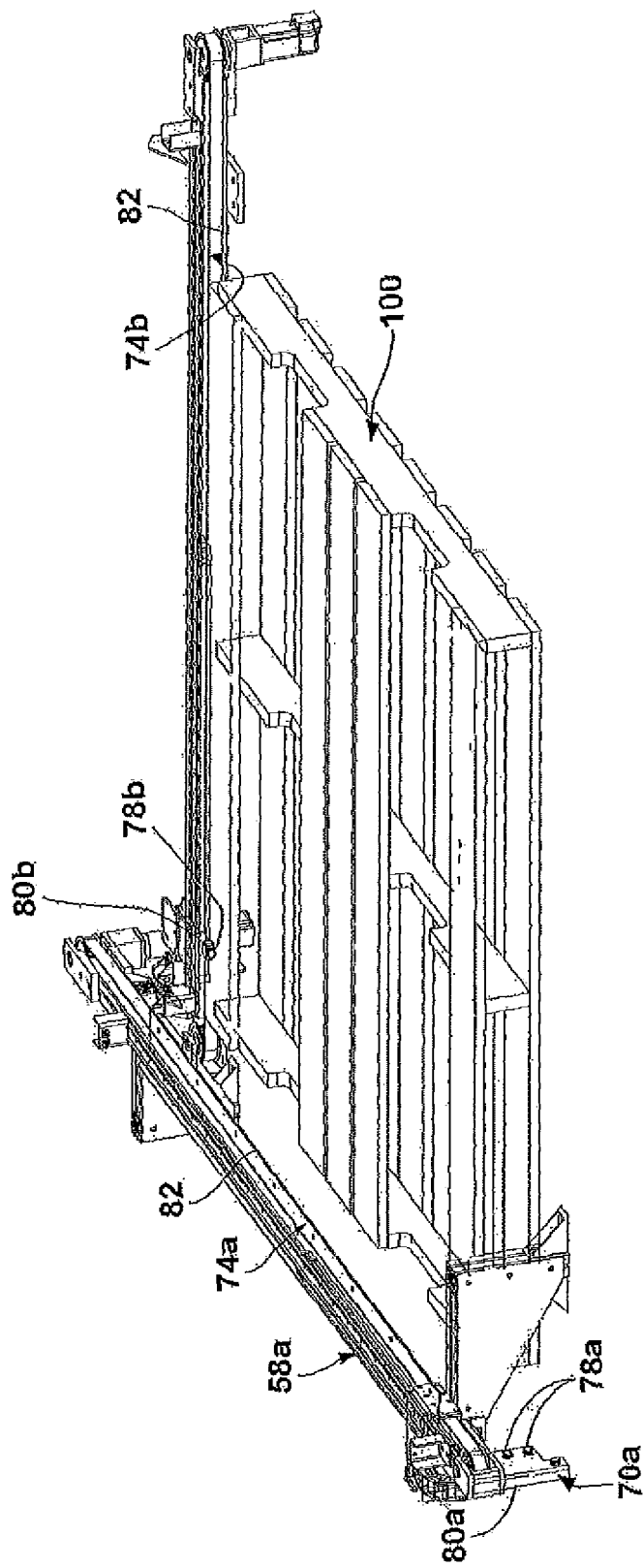
FIG. 11 is a fragmentary right perspective view of the portions of the sensing units of the measuring station of FIG. 8 with a pallet shown.

As shown in FIGS. 3-4, a system 22 for dismantling the wooden pallets 100 includes a loading area 18, feed system 24, a manipulator 26, a saw 28, and an unloading system 29, each in communication with a controller 30. Generally, a plurality of the pallets 100 is provided to the manipulator 26 via the feed system 24, wherein the manipulator 26 withdraws individual ones of the pallets 100 from the feed system 24, and presents the pallets 100 to the saw 28 for dismantling.

Referring to FIGS. 3-11, the feed system 24 includes a substantially continuous conveyor bed 31 with a plurality of rollers 33 including a gage station 32, a staging area 34, and a discharge conveyor 36. The pallets 100 travel along the conveyor bed 31 in a direction of travel indicated by the arrow. Each of the gage station 32 and the staging area 34 includes the conveyor bed 31 which may be powered, wherein the rollers 33 are mechanically driven, while the discharge conveyor 36 is a portion of the conveyor bed 31 which is typically not driven, wherein the rollers 33 are gravity fed. However, the entire conveyor bed 31 of the feed system 24 or portions thereof can be driven or undriven, as desired. In the illustrated embodiment, the powered or driven portions of the conveyor bed 31 are chain-driven line-shaft roller (CDLR) conveyors having a plurality of powered rollers, as are known in the art. However, those skilled in the art will understand that other types of powered conveyor beds can be used.

The portion of the conveyor bed 31 comprising the gage station 32 and the staging area 34 is oriented at an oblique angle α with respect to horizontal, level or a support surface the feed system 24 is positioned on, wherein the conveyor bed 31 is inclined from a first side of the conveyor bed 31 to a second side of the conveyor bed 31. The inclined orientation of the conveyor bed 31 advantageously urges the pallets 100 towards a datum wall 38 formed on the first side of the conveyor bed 31 as the pallets 100 move along the conveyor bed 31. As discussed hereinbelow, the datum wall 38 of the conveyor bed 31 is used to align sides of the pallets 100 along a common side (i.e. the first side) of the conveyor bed 31 for measurement and retrieval. For example, the pallets 100 may vary between dimensions of 30 inches by 30 inches and 60 inches by 60 inches. In order for the side of the pallets 100 to travel substantially parallel to the first side of the conveyor bed 31, the angle α is desired so the pallets 100 are not skewed with respect to the direction of travel. It has been discovered the angle α of between 3 degrees and 10 degrees provides favorable results, and that the angle α of 5 degrees is ideal for coaxing the pallets 100 towards the datum wall 38 while moving in the direction of travel, which minimizes a lateral slip of the pallets 100 while stationary.

The feed system 24 further includes a plurality of gates 40a, 40b, 40c, 40d, 40e disposed along the conveyor bed 31. The gates 40a, 40b, 40c, 40d, 40e are configured to selectively obstruct travel of the pallets 100 along the feed system 24. In the illustrated embodiment, each of the gates 40a, 40b, 40c, 40d, 40e is a rotatable flap extending across the width of the conveyor bed 31. The gates 40a, 40b, 40c, 40d, 40e are selectively positionable between a first position and a second position. In the first position, the gates 40a, 40b, 40c, 40d, 40e extend outwardly from a travel surface 41 of the conveyor bed 31 to obstruct the passage of the pallets 100 therealong. In the second position, the gates 0a, 40b, 40c, 40d, 40e are retracted from the conveyor bed 31 to allow the passage of the pallets 100 thereby. The gates 40a, 40b, 40c, 40d, 40e are mechanically extended to the first position or retracted to the second position depending on the position of the pallets 100 on the conveyor bed 31. Other means of selectively obstructing the passage of the pallets 100 along the conveyor bed 31 will be appreciated by those skilled in the art.

As shown in FIGS. 5-11, the gage station 32 includes a flipping station 42 and a measuring station 44. In the embodiment shown, the flipping station 42 of the gage station 32 includes an inverter 46 and a pair of the gates 40a, 40b. Particularly, a first one of the gates 40a is disposed at an intermediate portion of the flipping station 42 and is configured to stop the pallet 100 within the inverter 46 and a second one of the gates 40b is disposed downstream of the inverter 46 with respect to the direction of travel along the conveyor bed 31.

The inverter 46 includes a pair of cradles 48, including a lifting cradle 48a and a lowering cradle 48b. The cradles 48 are pivotally coupled to a lift frame 57 of the inverter 46 on opposing sides of the first one of the gates 40a. Thus, the lifting cradle 48a is disposed on an upstream side of the first one of the gates 40a with respect to the direction of travel and the lowering cradle 48b is disposed on a downstream side of the first one of the gates 40a with respect to the direction of travel. A first end 50 of each of the cradles 48 is pivotally coupled to the lift frame 57 adjacent the first one of the gates 40a, and an opposing second end 52 is spaced from the first one of the gates 40a. The second end 52 pivots about the first end 50 of each of the cradles 48.

Each of the cradles 48 includes a plurality of cross members 54 spanning a width of the conveyor bed 31 in a direction substantially perpendicular to the direction of travel and forming a cradle bed for receiving the pallets 100 thereon. On each side of the cradles 48, opposing funnel plates 56 taper outwardly from the cradle bed at the sides of the cradles 48. The funnel plates 56 are configured to guide the pallets 100 into the pair of cradles 48.

Each of the cradles 48 is selectively positionable in a first position and a second position. In the first position of the cradles 48, the cradles 48 are retracted and received within the conveyor bed 31 at the flipping station 42. Particularly, the cross members 54 of each of the cradles 48 are received intermediate the rollers 33 of the conveyor bed 31 to allow the pallets 100 to pass along the flipping station 42 and along the conveyor bed 31 in the direction of travel of the pallets 100. In the second position, the cradles 48 are pivoted to a substantially upright position, wherein a surface of each of the cradles 48 face each other and are configured to position the pallet 100 substantially upright.

The inverter 46 is supported by the lift frame 57, wherein the lift frame includes a plurality of frame members. As shown, the lifting frame 57 includes a plurality of air actuated cylinders configured to cause each of the cradles 48 to pivot about the first end 50 thereof. The cylinders are disposed on each side of the conveyor bed 31. It is understood that other systems can be employed for pivoting each of the cradles 48. For example, the cradles 48 can each be coupled to a shaft extending between the sides of the conveyor bed 31 and rotatably driven by a drive system.

The measuring station 44 is disposed downstream of the flipping station 42 with respect to the direction of travel along the conveyor bed 31. The flipping station 42 is configured to ensure the pallets 100 are provided to the measuring station 44 in a bottom-side-up orientation. The measuring station 44 includes a plurality of sensor units, including a first sensor unit 58a and a second sensor unit 58b. The first sensor unit 58a and the second sensor unit 58b are configured to measure dimensions of the pallets 100, as well as determine a position of the deck boards 106 and stringers 108 of the pallet 100. The sensor units 58a, 58b are in signal communication with the controller 30.

The first sensor unit 58a extends in a width direction of the conveyor bed 31 or substantially perpendicular to the direction of travel. The first sensor unit 58a includes a first sensor 70a linearly moveable along a first sensor drive system 74a which extends along a width of the conveyor bed 31. The first sensor drive system 74a guides the first sensor 70a from the second side of the conveyor bed 31 to the first side of the conveyor bed 31. The first sensor 70a further includes a first reflector plate 72a disposed substantially parallel with and upstream from the first sensor 70a and first sensor drive system 74a with respect to the direction of travel. The first sensor unit 58a cooperates with the first reflector plate 72a to determine positions of portions of the pallets 100, and thus, dimensions of the pallets 100 traveling through the measuring station 44 along the direction of travel. The first sensor unit 58a further includes a first guard 76a positioned over and covering the first sensor 70a and the first sensor drive system 74a to militate against damage to and particulates forming on the first sensor 70a and the first sensor drive system 74a.

The first sensor 70a includes a plurality of first sensing units 78a emitting light or radiation such as retroreflective photo eyes coupled to a first mount 80a engaging the first sensor drive system 74a to move the first sensor 70a linearly along the width of the conveyor bed 31. The first reflector plate 72a includes a layer such as a film or retro reflective tape extending along a length of the first reflector plate 72a. As the first sensor 70a is guided along the first sensor drive system 74a, the first sensing units 78a cooperate with the first reflector plate 72a to obtain a length of the pallets 100 and the dimensions of the notches 109 formed in the pallets 100. For example, the first sensing units 78a emit the light or the radiation towards the first reflecting plate 72a. The layer on the first reflector plate 72a reflects the emitted light or the radiation back towards the first sensing units 78a. However, when the pallets 100 are traveling through the measuring station 44, the emission of the light or radiation from the first sensing units 78a to the first reflector plate 72a is blocked by the portions of the pallets 100. As a result, the first sensing units 78a obtain the measurements of areas unblocked by the pallets 100. For example, the first sensing units 78a cooperate with the first reflector plate 72a to record a first point adjacent a first end of the pallets 100 and a point adjacent a second end of the pallets 100. Additionally, the first sensing units 78a obtain points where the notches 109 are located. A difference between the unblocked portion and the blocked portions are obtained by the first sensing units 78 to obtain the length of the pallets 100 and dimensions of the notches 109 of the pallets 100. The length and dimensions of the notches 109 of the pallets 100 are communicated to the controller 30.

The second sensor unit 58b extends along a length of the conveyor bed 31 or substantially parallel to the direction of travel. The second sensor unit 58b includes a second sensor 70b linearly moveable along a second sensor drive system 74b which extends along a length of the conveyor bed 31 along the first side thereof. The second sensor drive system 74b guides the second sensor 70b along a length portion of the conveyor bed 31 at the measuring station 44. The second sensor unit 58b further includes a second reflector plate 72b disposed substantially parallel with and laterally spaced from the second sensor 70b and the second sensor drive system 74b at the second side of the conveyor bed 31. The second sensor 70b cooperates with the second reflector plate 72b to obtain positions of portions of the pallets 100, and thus, dimensions of the pallets 100 traveling through the measuring station 44 along the direction of travel. The second sensor unit 58b further includes a second guard 76b positioned over and covering the second sensor 70b and the second sensor drive system 74b to militate against damage to and particulates forming on the second sensor 70b and the second sensor drive system 74b.

The second sensor 70b includes a second sensing unit 78b emitting light or radiation such as retro photo eyes coupled to a second mount 80b engaging the second sensor drive system 74b to move the second sensor 70b linearly along the length of the conveyor bed 31. The second reflector plate 72b includes a layer such as a film or retro reflective tape extending along a length of the second reflector plate 72b. As the second sensor 70b is guided along the second sensor drive system 74b, the second sensing unit 78 cooperates with the second reflector plate 72b to obtain a width of the pallets 100 and the dimensions of or positions of the stringers 108 of the pallets 100. For example, the second sensing unit 78b emits the light or the radiation towards the second reflecting plate 72b. The layer on the second reflector plate 72b reflects the emitted light or the radiation back towards the second sensing unit 78b. However, when the pallets 100 are traveling through the measuring station 44, the emission of the light or radiation from the second sensing unit 78*b* to the second reflector plate 72*b* is blocked by the portions of the pallets 100. As a result, the second sensing unit 78*b* obtains the measurements of areas unblocked by the pallets 100. For example, the second sensing unit 78*b* cooperates with the second reflector plate 72*b* to record a first point adjacent a first side of the pallets 100 and a point adjacent a second side of the pallets 100. Additionally, the second sensing units 78*b* obtain points between the stringers 108. A difference between the unblocked portion and the blocked portions are obtained by the second sensing unit 78*b* to determine the width of the pallets 100 and dimensions or locations of the stringers 108 of the pallets 100. The width and dimensions or locations of the stringer 108 of the pallets 100 are communicated with the controller 30.

In the embodiment shown, the sensor drive systems 74*a*, 74*b* of the sensor units 58*a*, 58*b* include a timing belt 82 driven by a stepper motor, for example. The sensors 70*a*, 70*b* are moved due to a movement of the timing belt 82 driven by the stepper motor. The sensors 70*a*, 70*b* travel along a track 84. However, it is understood alternate systems can be employed to move the sensors 70*a*, 70*b* along the sensor drive systems 74*a*, 74*b*, as desired. Additionally, the sensor drive systems 74*a*, 74*b* can include other components commonly employed with drive systems such as chains, other sensors, valves, gears, or other components, as desired.

A lift riser 86 is disposed within a frame of the conveyor bed 31 of the measuring station 44 to raise the pallets 100 upwardly with respect to the travel surface 41 of the conveyor bed 31. The lift riser 86 is disposed below the travel surface 41 of the conveyor bed 31 in a first position and extends above the travel surface 41 of the conveyor bed 31 in a second position. The extension of the lift riser 86 in the second position raises the pallets 100 to facilitate precise measurements of the dimensions of the pallets 100 in the measuring station 44. The lift riser 86 includes a plurality of support members 88 coupled to a lifting system 90 mechanically enabled to lift each of the support members 88 intermediate adjacent ones of the rollers 33 of the measuring station 44.

A third one of the gates 40*c* is disposed adjacent the measuring station 44 to obstruct the pallets 100 from moving beyond the measuring station 44 until the dimensions of the pallets 100 are determined by the sensing units 58*a*, 58*b*.

Figure 12:
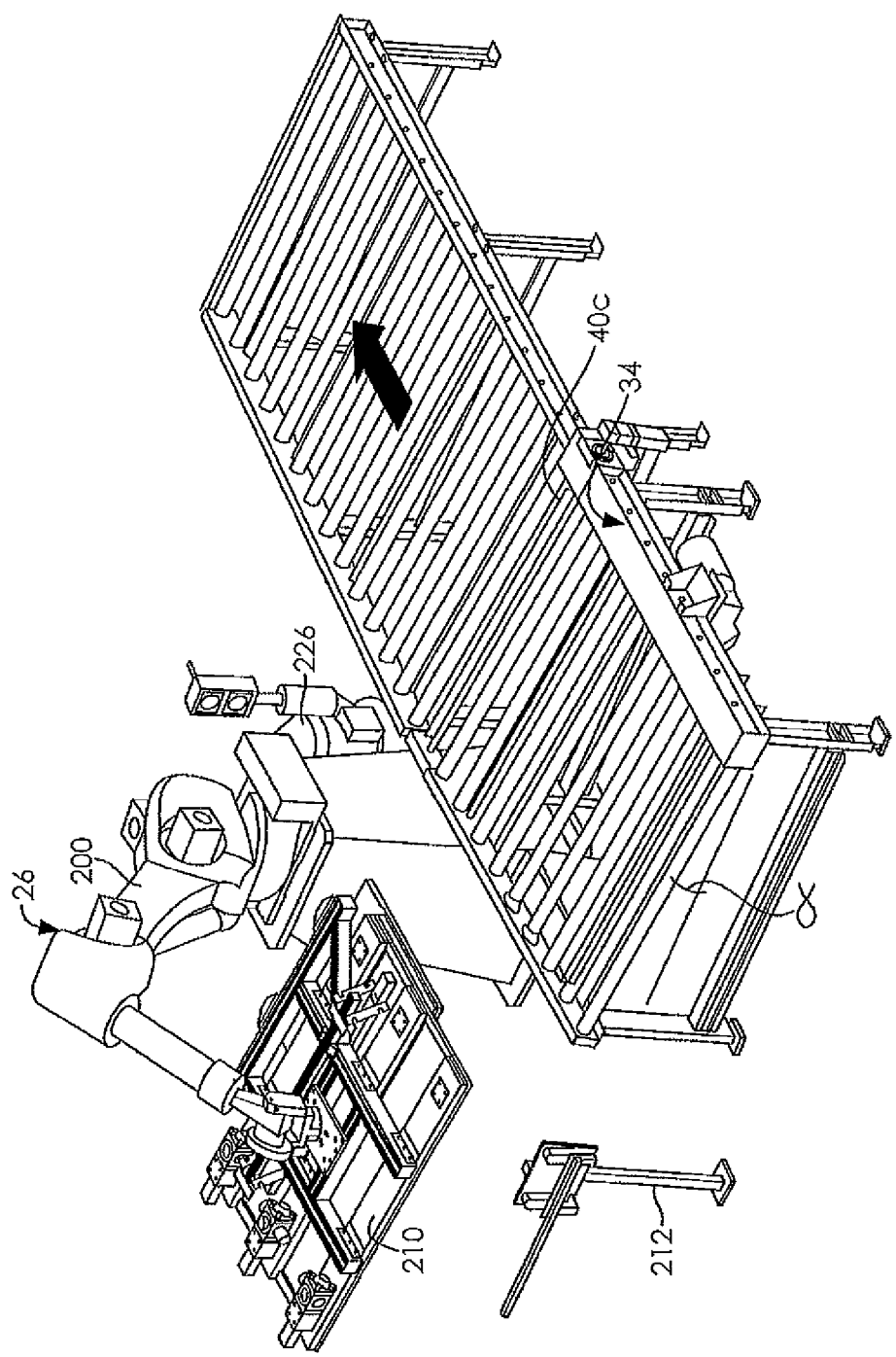
FIG. 12 is a top perspective view of a staging station and a manipulator of the system of FIGS. 3-4.
Figure 13:
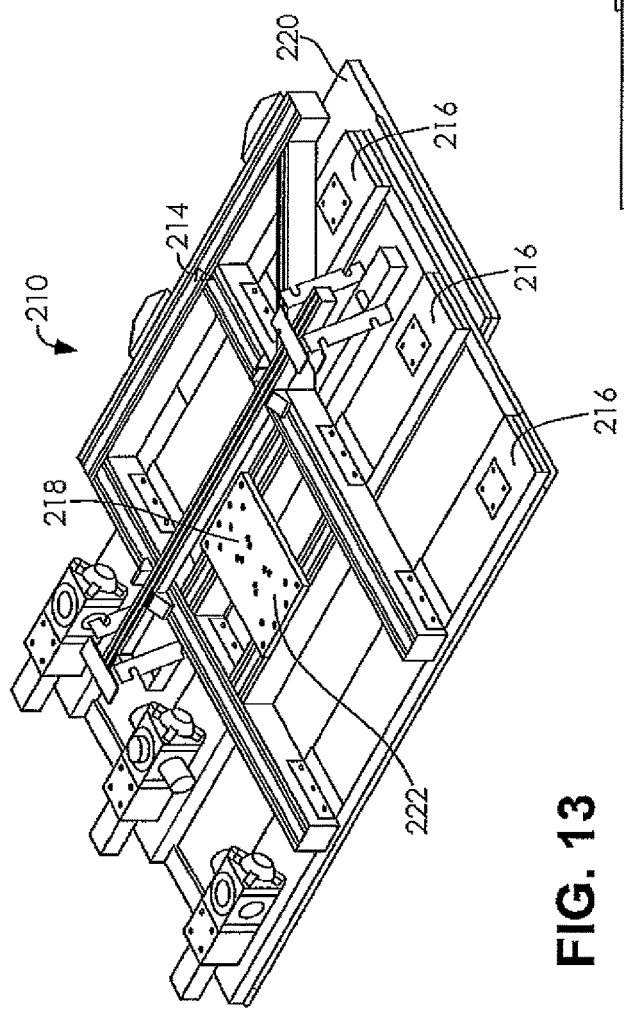
FIG. 13 is a top perspective view of an end of arm tool of the manipulator of FIG. 12.
Figure 14:
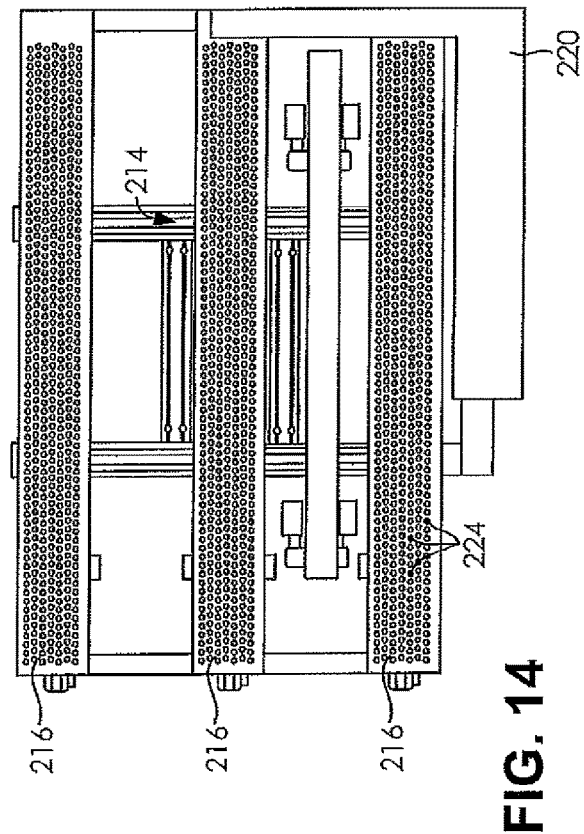
FIG. 14 is a bottom plan view of the end of arm tool of FIG. 13.
Figure 15:
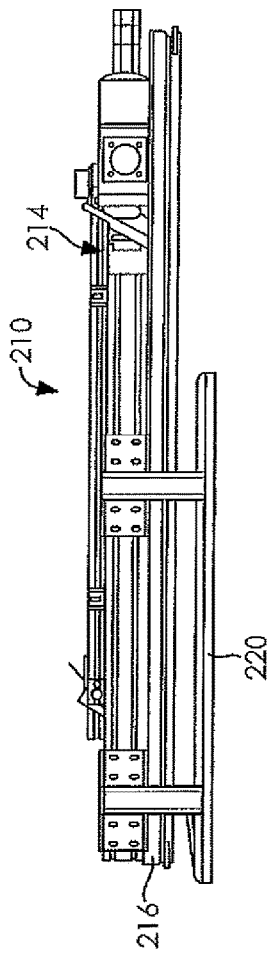
FIG. 15 is a side elevational view of the end of arm tool of FIGS. 13-14.
Figure 16:
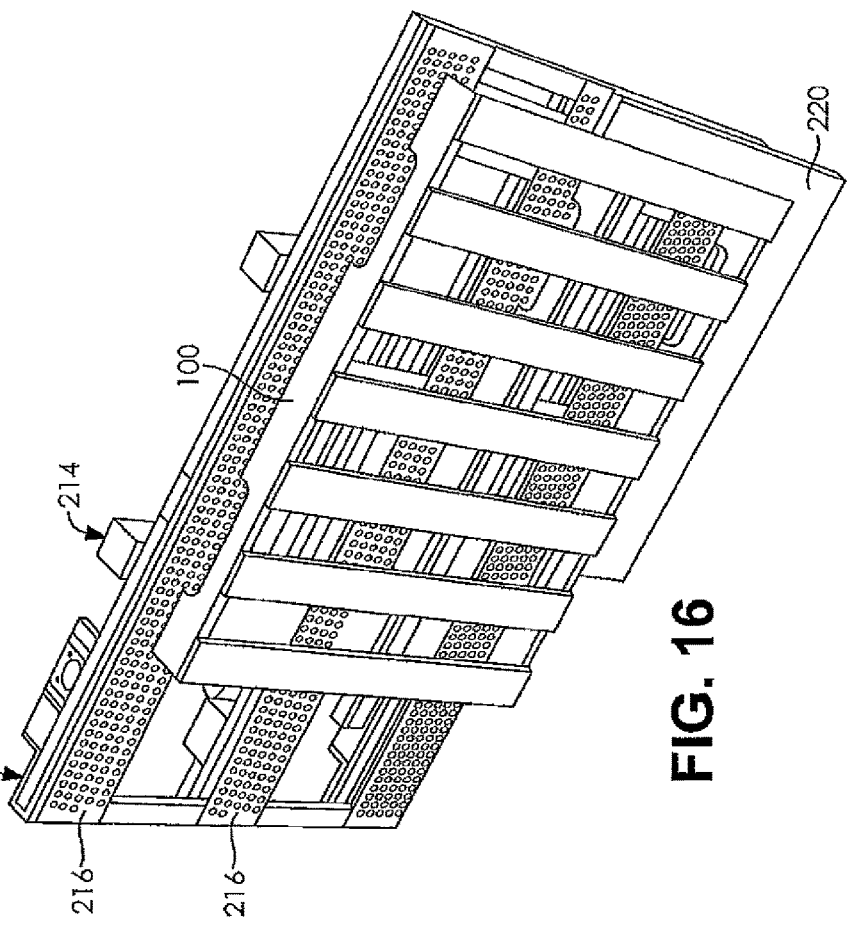
FIG. 16 is a bottom perspective view of the end of arm tool of FIGS. 13-15, with a pallet coupled to the end of arm tool.
Figure 17:
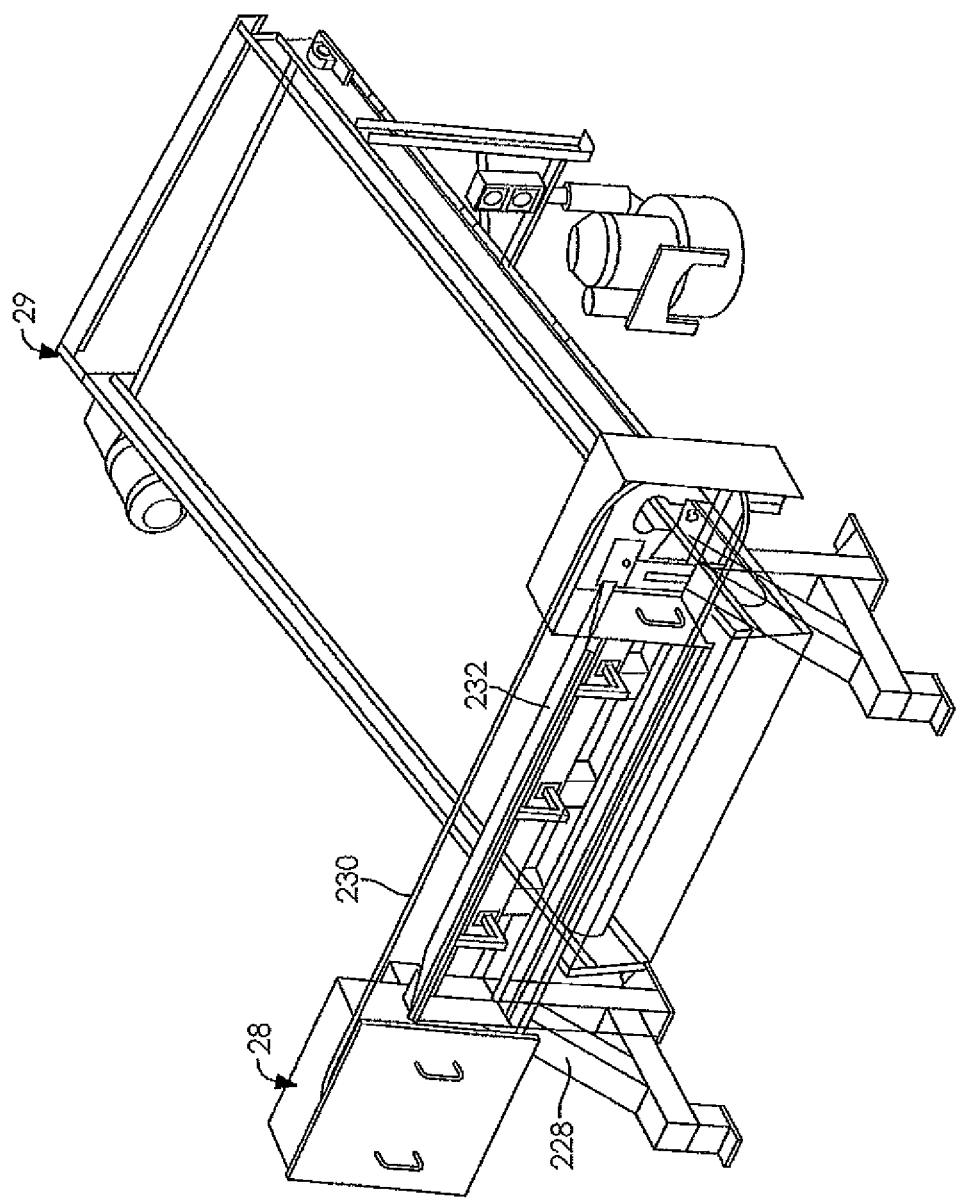
FIG. 17 is a top perspective view of a saw and an unloading station of the system of FIGS. 3-4.
Figure 18:
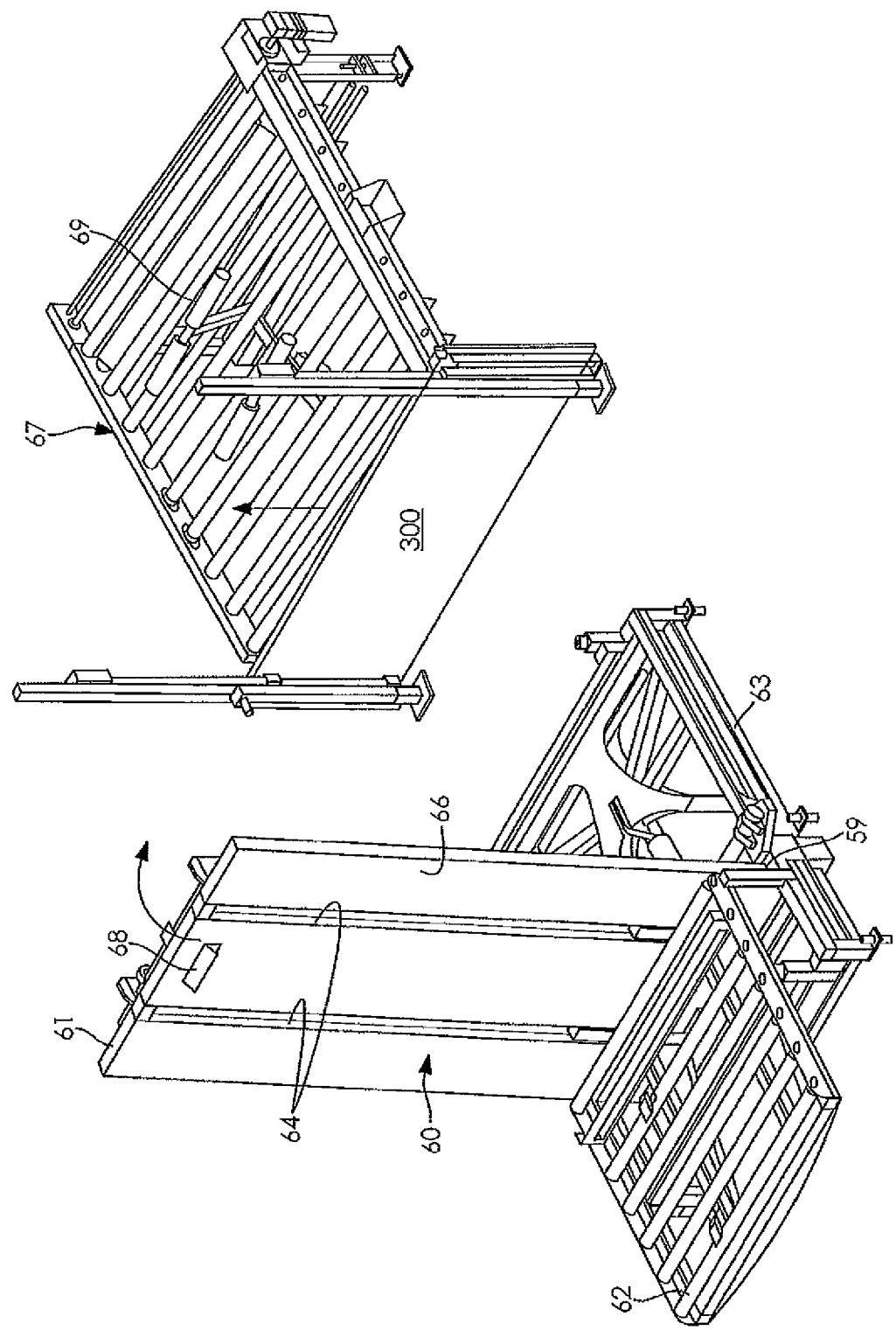
FIG. 18 is a top perspective view of an accumulator positioned in a loading area of the system of FIGS. 3-4.
Figure 19:
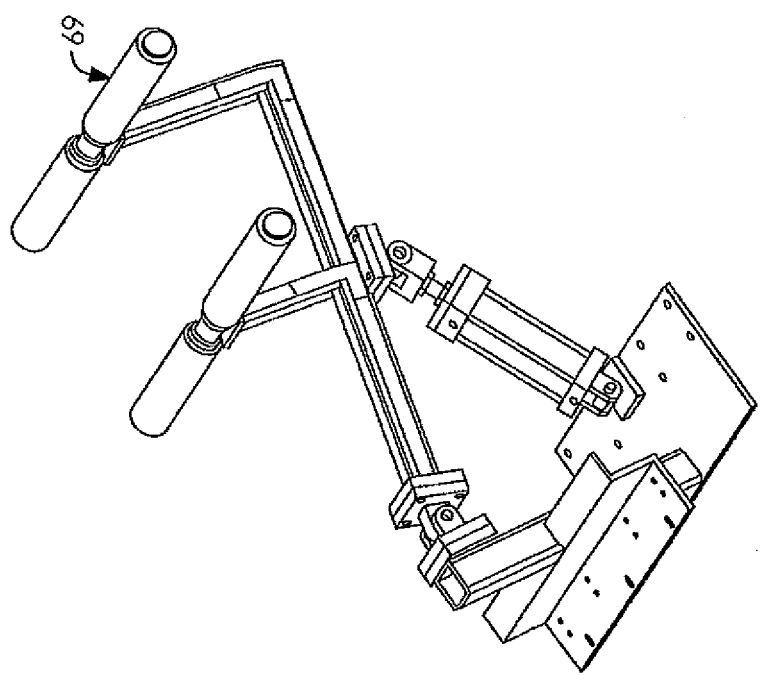
FIG. 19 is a top perspective view of a support member of the accumulator of FIG. 18.

Referring to FIGS. 3-4 and 12, the staging area 34 is positioned downstream of the measuring station 44 with respect to the direction of travel. The staging area 34 is positioned proximate the manipulator 26. A fourth one of the gates 40*d* is disposed at a downstream end of the gage station 32 and upstream of the infeed of the staging area 34 with respect to the direction of travel. The fourth one of the gates 40*d* obstructs the pallets 100 from entering the staging area 34 until the staging area 34 is clear of the pallets 100 or until the pallets 100 are prepared to enter the staging area 34. A fifth one of the gates 40*e* is disposed at the staging area 34 at an outfeed of the staging area 34. The fifth one of the gates 40*e* obstructs the pallets 100 from advancing beyond the staging area 34 until designated to advance to the discharge conveyor 36 disposed downstream and adjacent the staging area 34. Once the pallets 100 are positioned in the staging area 34, the manipulator 26 couples to and removes desired ones of the pallets 100 from the conveyor bed 31 of the feed system 24. Any undesired ones of the pallets 100 are permitted to proceed past the fifth one of the gates 40*e* for removal from the feed system 24.

As shown in FIGS. 12-17, the manipulator 26 comprises a multi-axis robotic arm 200, an end of arm tool (EOAT) 210, and a sensor device 212. The EOAT 210 is coupled to the robotic arm 200.

The robotic arm 200 may be a six-axis robotic arm capable of high-speed maneuvers and comprising multiple axes of rotation. One example of a suitable robotic arm is a model MH180 sold by Yaskawa America, Inc. Suitable substitutes will be appreciated by those of ordinary skill in the art.

The robotic arm 200 is generally positioned intermediate the feed station 24 and the saw 28, wherein the robotic arm 200 can retrieve one of the pallets 100 from the staging area 34 of the feed system 24 and move the pallets 100 to the saw 28. However, the robotic arm 200 may be positioned in any location wherein the EOAT 210 can reach each of the staging area 34, the sensor device 212, and the saw 28. The sensor device 212 measures or determines a height of the pallets 100. The robotic arm 200 can be positioned on a stand configured to hold the robotic arm 200.

The EOAT 210 is configured to hold the pallets 100 at an end of the robotic arm 200 during disassembly of the pallets 100. As shown, the EOAT 210 is a vacuum device configured to suspend the pallets 100 from the robotic arm 200 and transfer the pallets 100 to the saw 28 for disassembly. However, it is understood that other EOATs can be used as desired without departing from the scope of the invention.

The EOAT 210 comprises a mounting frame 214 and a plurality of vacuum grippers 216. The mounting frame 214 in the illustrated embodiment includes a fabricated tubular structure having a mounting plate 218 disposed thereon. The mounting plate 218 is configured for coupling the mounting frame 214 to the robotic arm 200. The mounting frame 214 further includes an L-shaped zero plate 220 depending therefrom, wherein the L-shaped zero plate 220 is substantially parallel to a mounting surface 222 of the mounting plate 218.

The plurality of the vacuum grippers 216 depends from the mounting frame 214, wherein one of the vacuum grippers 216 depends from a corresponding cross member of the mounting frame 214. Although the illustrated embodiment shows three of the vacuum grippers 216, it will be appreciated more or fewer of the vacuum grippers 216 can be used, depending on a size and weight of the pallets 100 to be suspended therefrom.

When transporting the pallets 100 from the staging area 34 to the saw 28, the vacuum grippers 216 are oriented transverse to the deck boards 106 forming the top deck 102 of the pallets 100, wherein each of the vacuum grippers 216 traverses a plurality of the deck boards 106. Orienting the vacuum grippers 216 transverse to the deck boards 106 of the pallets 100 is advantageous, as it allows the EOAT 210 to accommodate variable positions of deck boards 106 associated with different sized pallets 100 and manufacturing inconsistencies.

The vacuum grippers 216 are connected to a vacuum generator 226 and include a plurality of apertures 224 disposed on a bottom surface of the vacuum grippers 216. It is understood a foam material or other porous material may be disposed on the bottom surface of the vacuum grippers 216. One illustrative embodiment of the vacuum grippers 216 is the Unigripper model SMS-110 vacuum gripper sold by Tepro Machine & Pac System 22 AB.

The EOAT 210 is coupled to the robotic arm 200 and is configured to move the pallets 100 from the staging area 34 to the saw 28. The controller 30 communicates with the manipulator 26 to determine Y values and X values. The Y values are associated with the length of the pallets 100 and the notches 109 of the pallets 100 and the X values are associated with the widths and the stringers 108 of the pallets 100 at the measuring station 44. The robotic arm 200 is then controlled by the controller 30 to move the pallets 100 along the path of the robotic arm 200 compensating for the dimensions determined at the measuring station 44. The robotic arm 200 also guides the pallets 100 by the sensor device 212, wherein a height of the pallets 100 is determined and communicated to the controller 30, and thus, to the robotic arm 200.

The robotic arm 200, with the EOAT 210, retrieves the pallets 100 at the staging area 34. A sensor such as a proximity sensor or pressure sensor can be positioned at or proximate the conveyor bed 31 at the staging area 34 to militate against the robotic arm 200 and the EOAT 210 applying undesired pressure to the pallet 100 at the staging area 34. Undesired pressure may cause damage to the pallets 100 and/or the conveyor bed 31. Once the pallets 100 are retrieved, the robotic arm 200 guides the pallets 100 past the sensor device 212 and to the saw 28.

A lift riser similar to the lift riser 86 of the measuring station 44 can be positioned below the staging area 34 configured to the raise the pallets 100 for presentation to the robotic arm 200 and the EOAT 210.

The saw 28 includes a frame 228 and a continuous blade 230 driven by a drive system. A guard plate 232 is positioned over portions of the saw 28 to militate against particulates being received in the saw 28 and damaging the saw 28. The guard plate 232 is angled towards the unloading system 29.

The unloading system 29 is an inclined belt conveyor. The robotic arm 200 guides the pallets 100 to the saw 28 to dismantle the saw 28. The dismantled portions of the pallets 100 drop on the unloading system 29 and are conveyed along the unloading system 29. The dismantled pallets 100 can then drop into a bin or container to be stored or used to recycle the pallets 100. The dismantling of the pallets 100 at the saw 28 will be described in further detail hereinbelow.

Referring to FIGS. 3-4 and 18-19, the feed system 24 includes the loading area 18 for introducing the pallets 100 to the conveyor bed 31. The loading area 18 may optionally include an accumulator 20. When present, the accumulator 20 is disposed adjacent an upstream inlet end of the conveyor bed 31 upstream from the flipping station 42. The accumulator 20 includes a tipping platform 60 and an infeed conveyor 67. The infeed conveyor 67 is positioned adjacent the infeed of the conveyor bed 31 of the gage station 32. The travel surface 41 of the infeed conveyor 67 is continuous with the travel surface 41 of the conveyor bed 31 of the gage station 32 to seamlessly permit the pallets 100 to travel from the infeed conveyor 67 to the gage station 32.

The tipping platform 60 is pivotably coupled to a frame 63 spaced at a distance from the infeed conveyor 67. The tipping platform 60 is pivotable about a mechanically driven pivot such as a rotating shaft. An advancement platform 62 is coupled to the tipping platform 60 and extends outwardly substantially perpendicularly from the tipping platform 60. The advancement platform 62 travels linearly along tracks 64 formed lengthwise in a travel surface 66 of the tipping platform 60. The tracks 64 are formed substantially parallel to the direction of travel and extend adjacent a first end 59 of the tipping platform 60 to adjacent a second end 61 of the tipping platform 60. In the embodiment illustrated, the tipping platform 60 includes the pair of tracks 64. However, it is understood, more than or fewer than two tracks 64 can be formed in the tipping platform 60 and employed to advance or move the advancement platform 62 along the tipping platform 60. The tracks 64 can include slots formed in the tipping platform 60 and a linear advancing device such as a chain, chord, linear bearing, rod, rails belt, or any other advancing device configured to guiding the advancement platform 62 linearly along the tipping platform 60.

The tipping platform 60 is positionable between a first position and a second position. In the first position, the tipping platform 60 is substantially perpendicular to level with respect to the frame 63 or the surface the accumulator 20 is positioned on. The second end 61 of the tipping platform 60 is disposed in an upwards position and spaced away from the conveyor bed 31. The advancement platform 62 is disposed substantially parallel to level with respect to the frame 63 or the surface the accumulator 20 is positioned on. In the first position, the pallets 100 can be stacked on the advancement platform 62 by the operator or a fork lift, for example.

In the second position, the tipping platform 60 is substantially parallel to level with respect to the frame 63 or the surface the accumulator 20 is positioned on. The second end 61 of the tipping platform 60 is disposed adjacent the infeed conveyor bed 67. The advancement platform 62 is disposed substantially perpendicular to level with respect to the frame 63 or the surface the accumulator 20 is positioned on. In the second position, the advancement platform 62 is configured to advance the pallets 100 along the tracks towards the second end 61 of the tipping platform 60 in order for the pallets 100 to transfer to the infeed conveyor 67 and thus to the conveyor bed 31 of the gage station 32. The pallets 100 travel along the tipping platform 60 on sides of the pallets 100, wherein the pallets 100 are substantially perpendicular to the travel surface 66 of the flipping platform 60.

A stopper 68 is positioned adjacent the second end 61 of the flipping platform 60 and configured to stop the stack of the pallets 100 before advancing to the infeed conveyor 67 when the flipping platform 60 is in the second position. The stopper 68 is wedge-shaped. When the pallets 100 are abutting the stopper 68, the operator can place the pallets 100 one at a time onto the conveyor bed 31. In certain embodiments, the stopper 68 can include a sensing device for alerting the operator when one of the pallets 100 is in contact with the wedge or alerting the operator when the accumulator 20 is empty of the pallets 100 and needs refilled. In another embodiment, the sensing device of the stopper 68 can be in signal communication with a driving mechanism driving the advancement platform 62 along the tracks 64. The sensing device of the stopper 68 signals the driving mechanism to retreat the advancement platform 62 from the second end 61 of the tipping platform 60 towards the first end 59 of the tipping platform 60. Once the advancement platform 62 is retreated, the tipping platform 60 can move from the second position to the first position for restacking of additional pallets 100 onto the advancement platform 62. The sensing device can be a proximity sensor, pressure sensor, a switch, or any other types of sensing device to indicate when one of the pallets 100 or the advancement platform 62 is proximate to or in contact with the stopper 68.

The infeed conveyor 67 includes the conveyor bed 31 with a plurality of rollers 33. A support device 69 extends from the travel surface 41 of the infeed conveyor 67. In the embodiment illustrated, the support device 69 includes a pair of parallel cushioned arms to receive the pallets 100 from the tipping platform 60. It is understood, more or fewer arms can be employed to receive the pallets 100 on the support device 69. The support device 69 is coupled to a cylindrical mount to raise and lower the support device, wherein the pallets 100 fall onto the support device 69 and then are lowered on the conveyor bed 31 of the infeed conveyor 67. The support device 69 biases towards the conveyor bed 31 of the infeed conveyor when pressure from the pallets 100 are applied to the support device 69. Advantageously, the support device 69 minimizes damage to the conveyor bed 31 of the infeed conveyor 67 and the pallets 100.

A safety door 300 is disposed adjacent the infeed conveyor 67. The safety door 300 is a substantially planar platform that raises and lowers in a direction of the vertical arrow shown. As shown, the door 300 is in the first lowered position. However, the door 300 raises to a second raised position when the tipping platform 60 retreats to the first position and when the tipping platform 60 is lowered to the second position. The safety door 300 raises and lowers via tracks. The safety door 300 militates against the pallets 100 tipping onto the conveyor or falling when the tipping platform 60 is moving with the stacked pallets 100 from the first position to the second position. The safety door 300 can be lowered by an operator or automatically for the operator to place the pallets 100 on the conveyor bed 31.

In use, as the pallets 100 are provided to the feed system 24, an operator monitors the orientation of each of the pallets 100 to ensure the pallets 100 are facing bottom-side-up, wherein the bottom of the pallet 100 is facing away from the travel surface 41 of the conveyor bed 31. If the operator identifies one of the pallets 100 in a bottom-side-down orientation, wherein the bottom of the pallet 100 faces the travel surface 41 of the conveyor bed 31, the pallet 100 is flagged by the operator as needing to be flipped over to the bottom-side-up orientation. The pallet 100 then advances into the flipping station 42. The pallet 100 is stopped within the lifting cradle 48*a* of the inverter 46 by the first one of the gates 40*a*. The lifting cradle 48*a* is then moved from the first position to the second position to lift and rotate the pallet 100 to an upright position on a side of the pallet 100.

Simultaneously, the lowering cradle 48*b* is moved from the first position to the second position, wherein the pallet 100 is disposed intermediate the cradles 48. The pallet 100 is rotatingly transferred over a center portion between the cradles 48 and is supported by the lowering cradle 48*b* as the lowering cradle 48*b* is moved to the first position. Accordingly, the pallet 100 is flipped from the bottom-side-down orientation to the bottom side-up orientation. It is understood other systems can be employed to flip the pallet 100 between the bottom-side-down orientation to the bottom side-up orientation. Additionally, the operator can manually flip the pallets 100. The second one of the gates 40*b* selectively stops the pallet 100, when in the first position, from traveling in the direction of travel beyond the flipping station 42, if desired. For example, it may be desired to stop the pallet 100 at the flipping station 42 to militate against the pallets 100 accumulating downstream of the flipping station 42.

The pallets 100 then travel to the measuring station 44, wherein a third one of the gates 40*c* stops the pallets 100 to be measured. The lift riser 86 raises the pallets 100 above the travel surface 41 of the conveyor bed 31 for accurate measurements. The sensing units 58*a*, 58*b* measure the dimensions of the pallets 100 and convey the information to the controller 30 which communicates with the manipulator 26. After the measuring station 44, the pallets 100 are conveyed to the staging area 34. A fourth one of the gates 40*d* may stop the pallets 100 before the staging area 34 until a previous one of the pallets 100 is removed from the staging area 34 or until desired. When the pallets 100 enter the staging area 34, a fifth one of the gates 40*e* stops the pallets 100 at the staging area 34. When a lift riser is positioned at the staging area 34, the pallets 100 are raised above the travel surface 41 of the conveyor bed 31. The robotic arm 200 positions the EOAT 210 above the pallets 100 and the suction from the EOAT 210 picks the pallets 100 up bottom-side-up. The robotic arm 200 guides the pallets 100 past the sensor device 212 to measure the height of the pallets 100. The robotic arm 200 then guides the pallets 100 to be presented to the saw 28.

The pallets 100 are presented to the saw 28, by the robotic arm 200, for a first cut. In a first step of the dismantling sequence, the pallet 100 is presented to the saw 28. The pallet 100 is lifted by the EOAT 210 in the bottom side up orientation, wherein top deck 102 boards 106 of the pallet 100 are facing downwardly and the pallet 100 is suspended from the EOAT 210 by the bottom deck 104 boards 106. However, in alternate embodiments, the pallets 100 may be oriented top side up, wherein the bottom deck 104 faces downward, and the pallet 100 is suspended from the EOAT 210 by the top deck 102. The pallets 100 are oriented by the robotic arm 200, wherein a plane formed by the deck boards 100 is parallel to the cut plane of the blade 230.

As illustrated in FIGS. 20-24, a sequence of dismantling is shown. Based on the known size of the pallet 100, the system 22 can determine the position and spacing of the deck boards 106 of the pallet 100.

Figure 20:
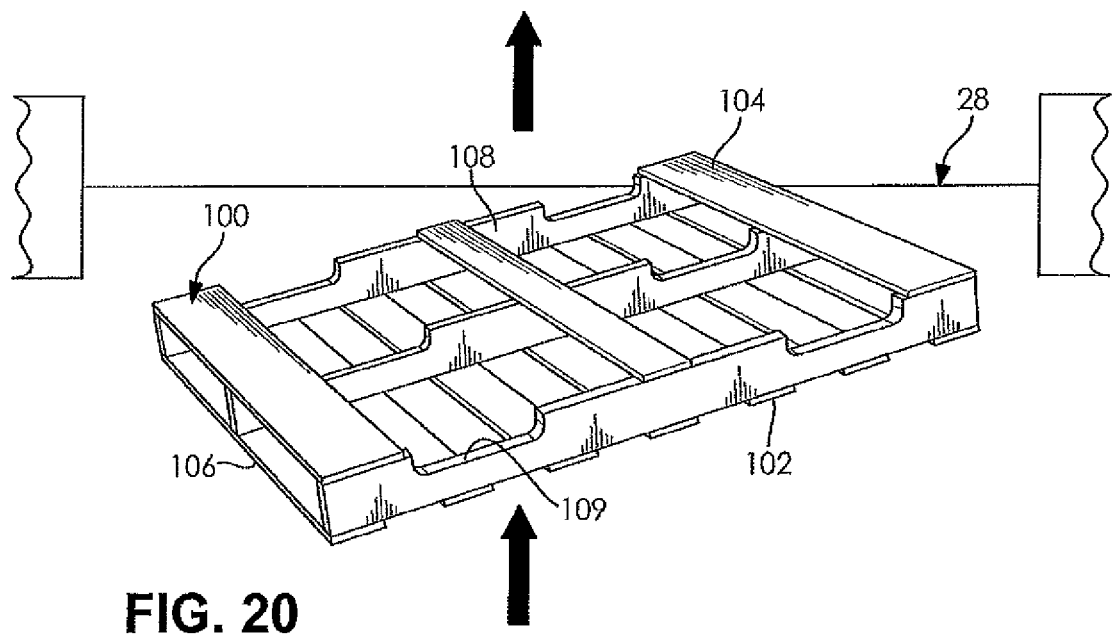
FIGS. 20-24 are schematic illustrations showing the steps for dismantling the pallets with the saw of FIG. 17.
Figure 21:
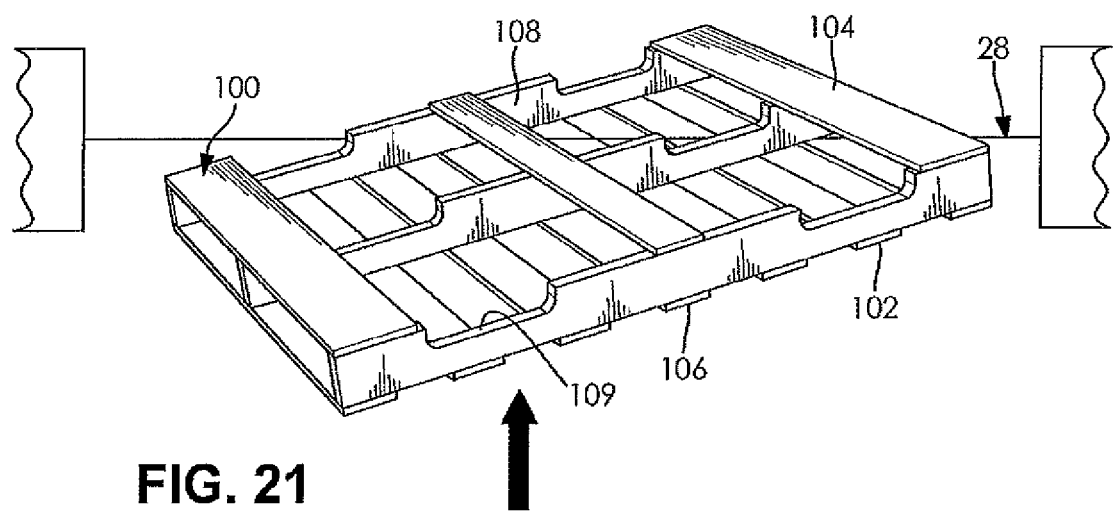
Figure 22:
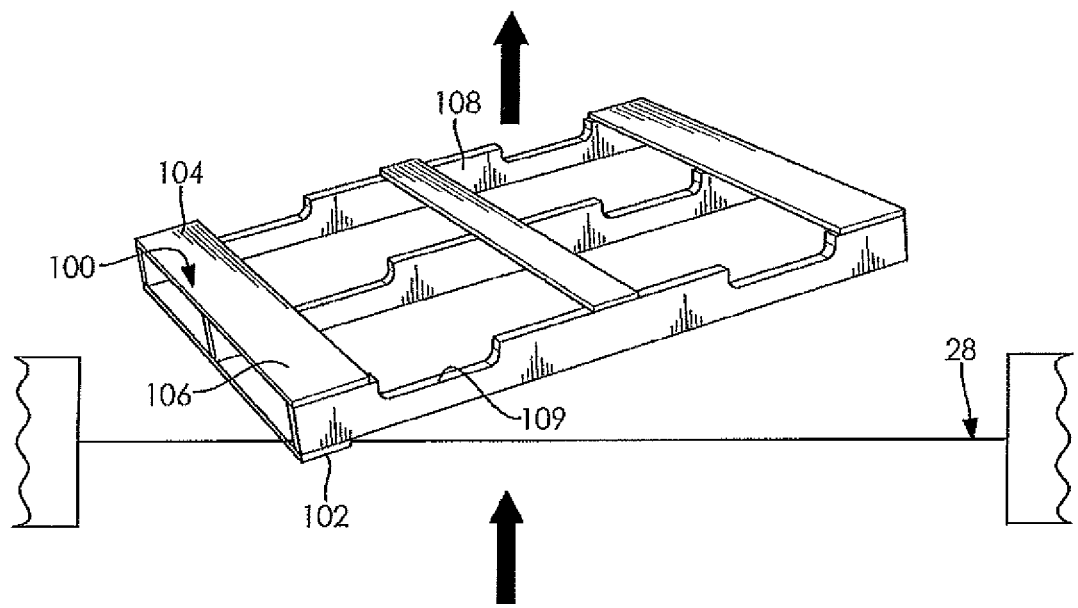

In FIG. 20, the pallets 100 are guided through the saw 28, wherein the top deck 102 of the pallets 100 is removed first. Particularly, the robotic arm 200 presents the pallets 100 to the blade 230 at a skewed angle with respect to the direction of travel, wherein the deck boards 106 are positioned at an angle with respect to the blade 230. The blade 230 begins a cut of the top deck 102 at a corner thereof. The blade 230 cuts through the pallets 100 intermediate the deck boards 106 of the top deck 102 and the stringers 108. In FIG. 21, the pallets 100 are guided in the direction of travel through the blade 230 to further the severing of the top deck 102 from the stringers 108. FIG. 22 illustrates the blade 230 nearly severing the entirety of the deck boards 106 from the top deck 102. During the first cut, the deck boards 106 of the top deck 102 are dismantled from the pallets 100 and fall to the unloading system 29. It is understood, the pallets 100 may be presented to the saw 28 at any angle as desired depending on the pallet or may be rotated at any angle during the process of the first cut.

Figure 23:
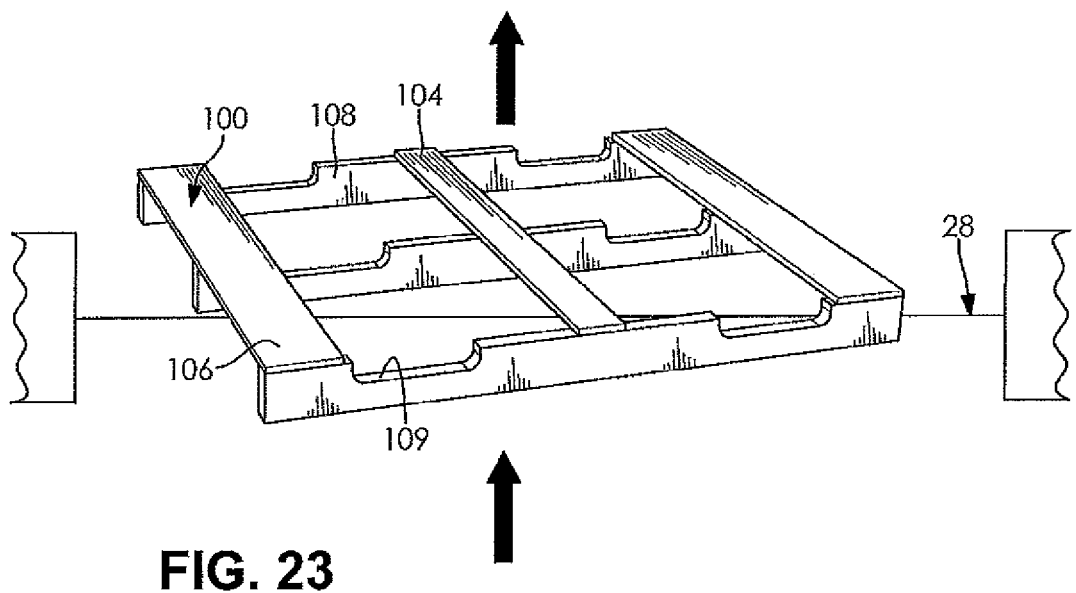

The pallets 100 are then presented to the saw 28 by the robotic arm 200 for a second cut. As shown in FIG. 23, the blade 230 is position intermediate adjacent ones of the stringers 108. The pallets 100 are then advanced in the direction of travel through the blade 230 and a first one of the stringers 108 is dismantled from the pallets 100.

Figure 24:
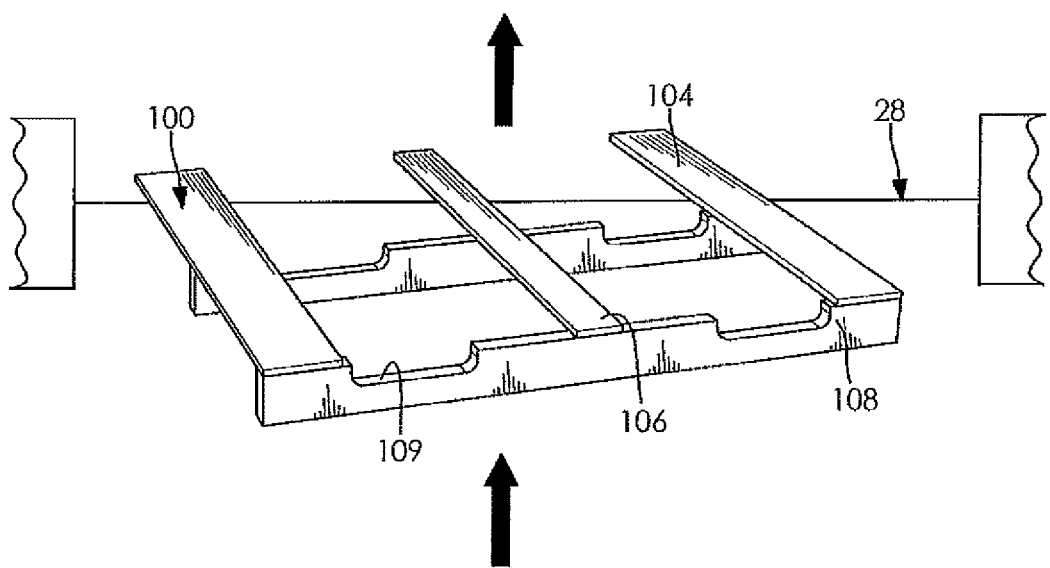

As shown in FIG. 24, the pallets 100 are then presented to the saw 28 by the robotic arm 200 for a third cut. The blade 230 is positioned adjacent one of the remaining stringers 108. The pallet 100 is then advanced forward with respect to the direction of travel through the blade 230 and the remaining stringers 108 are dismantled from the pallet 100. The remaining deck boards 106 of the bottom deck 104 of the pallet 100 are released by the EOAT 210 to complete the dismantlinge of the pallet 100. The dismantled deck boards 106 and stringers 108 are released to the unloading system 29 after the cuts and conveyed away.

As discussed hereinabove, the pallet 100 may be rotated about a vertical axis at an angle with respect to a cut edge of the blade 230, wherein the deck boards 106 are oriented at an oblique angle with respect to the cut edge of the blade 230. Particularly, it has been found that orienting the pallet 100 at an angle in a range between 15 degrees and 25 degrees provides favorable cutting conditions by minimizing the contact area between the blade 230 and the pallet 100.

With the pallet 100 rotated at an angle with respect to the cut edge of the blade 230, a directional force is applied in the cut direction of the saw 28, wherein a first one of the deck boards 106 is advanced towards the cut edge of the blade 230 to remove a first one of the deck boards 106. As the first one of the deck boards 106 is advanced through the saw 28, the pallet 100 may be oscillated about the vertical axis to vary the contact angle between the blade 230 and the pallet 100. Particularly, the pallet 100 may be oscillated between 15 degrees and 25 degrees with respect to the cut edge of the blade 230 as the pallets 100 proceed through the blade 230 of the saw 28. The orientation of the pallet 100 may be oscillated about the vertical axis between 15 and 25 degrees with each cut.

After each one of the pallets 100 is dismantled, the robotic arm 200 returns to the feed station 24 to retrieve another ballet, repeating the process described hereinabove.

Advantageously, the system 22 of the present disclosure ergonomically and efficiently dismantles pallets 100.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A system for dismantling a pallet, the system comprising:
   a pallet;
   a feed system configured to convey the pallet, the feed system having a measuring station and a staging area, the measuring station configured to obtain at least one of a width dimension or a length dimension of the pallet and to communicate a value of the at least one of the width dimension or the length dimension of the pallet to a controller;
   a saw configured to receive the pallet and dismantle the pallet; and
   a manipulator comprising a robotic arm and an end of arm tool configured to support the pallet, the manipulator configured to move the pallet from the staging area to the saw for dismantling, the manipulator configured to receive the of the at least one of the width dimension or the length dimension of the pallet from the measuring station via the controller, wherein the manipulator is configured to position and orient the pallet relative to the saw during the dismantling of the pallet based on the value of the at least one of the width dimension or the length dimension communicated to the manipulator via the controller, wherein the manipulator is configured to move the pallet relative to the saw in a direction of travel arranged perpendicular to a height dimension of the pallet during the dismantling of the pallet, wherein the manipulator is configured to orient the pallet to cause the width dimension and the length dimension of the pallet to be skewed relative to the direction of travel of the pallet when the pallet is moved relative to the saw during the dismantling of the pallet.

2. The system of claim 1, further comprising a sensor device configured to measure a height dimension of the pallet and to communicate a value of the height dimension of the pallet to the controller.

3. The system of claim 2, wherein the sensor device measures the height dimension of the pallet during movement of the pallet from the staging area to the saw via the manipulator.

4. The system of claim 2, wherein the manipulator is configured to receive the value of the height dimension of the pallet via the controller, and wherein the manipulator is configured to position and orient the pallet relative to the saw during the dismantling of the pallet based on the value of the height dimension.

5. A system for dismantling a pallet, the system comprising:
   a feed system configured to convey the pallet along a direction of travel, the feed system having a measuring station and a staging area, the measuring station configured to obtain dimensions of the pallet;
   an accumulator positioned adjacent an inlet of the feed system, the accumulator including a flipping platform pivotable between a first position and a second position and spaced from an infeed conveyor, and wherein an end of the flipping platform is substantially perpendicular to level in the first position, and wherein the end of the flipping platform is adjacent an inlet of the infeed conveyor;
   a saw configured to dismantle the pallet; and
   a manipulator including a robotic arm, the manipulator configured to move the pallet from the staging area to the saw for dismantling.

6. A system for dismantling a pallet, the system comprising:
   a pallet;
   a feed system configured to convey the pallet, the feed system having a measuring station and a staging area, the measuring station configured to obtain at least one of a width dimension or a length dimension of the pallet and to communicate a value of the at least one of the width dimension or the length dimension of the pallet to a controller;
   a saw configured to receive the pallet and dismantle the pallet; and
   a manipulator comprising a robotic arm and an end of arm tool configured to support the pallet, the manipulator configured to move the pallet from the staging area to the saw for dismantling, the manipulator configured to receive the of the at least one of the width dimension or the length dimension of the pallet from the measuring station via the controller, wherein the manipulator is configured to position and orient the pallet relative to the saw during the dismantling of the pallet based on the value of the at least one of the width dimension or the length dimension communicated to the manipulator via the controller, wherein the manipulator is configured to move the pallet relative to the saw in a direction of travel arranged perpendicular to a height dimension of the pallet during the dismantling of the pallet, wherein the pallet includes a top deck formed from a first plurality of deck boards and a bottom deck formed from a second plurality of deck boards spaced from the top deck with respect to the height dimension of the pallet, wherein the moving of the pallet relative to the saw during the dismantling of the pallet includes the removal of one of the top deck or the bottom deck from the pallet.

* * * * *